United States Patent
Takahashi et al.

(10) Patent No.: US 9,210,435 B2
(45) Date of Patent: Dec. 8, 2015

(54) VIDEO ENCODING METHOD AND APPARATUS FOR ESTIMATING A CODE AMOUNT BASED ON BIT STRING LENGTH AND SYMBOL OCCURRENCE FREQUENCY

(75) Inventors: Masashi Takahashi, Tokyo (JP); Nobuhiro Chihara, Tokyo (JP); Muneaki Yamaguchi, Tokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 357 days.

(21) Appl. No.: 13/400,907

(22) Filed: Feb. 21, 2012

(65) Prior Publication Data

US 2012/0219057 A1 Aug. 30, 2012

(30) Foreign Application Priority Data

Feb. 25, 2011 (JP) ................................. 2011-039699

(51) Int. Cl.
*H04N 7/12* (2006.01)
*H04N 19/194* (2014.01)
*H04N 19/176* (2014.01)
(Continued)

(52) U.S. Cl.
CPC ........... *H04N 19/194* (2014.11); *H04N 19/124* (2014.11); *H04N 19/13* (2014.11); *H04N 19/146* (2014.11); *H04N 19/174* (2014.11); *H04N 19/176* (2014.11); *H04N 19/61* (2014.11)

(58) Field of Classification Search
CPC .................... H04N 19/0009; H04N 19/00121; H04N 19/00169; H04N 19/00272; H04N 19/00278; H04N 19/00363; H04N 19/00781
USPC ...................................................... 375/240.23
See application file for complete search history.

(56) References Cited

U.S. PATENT DOCUMENTS 7,688,234 B2   3/2010   Koo
7,978,103 B2   7/2011   Seki et al.
(Continued)

FOREIGN PATENT DOCUMENTS

JP      2005-318296 A    11/2005
JP       2008-11431 A     1/2008
(Continued)

OTHER PUBLICATIONS

Koutsoyiannis ("Broken line smoothing: a simple method for interpolation and smoothing data series", Environmental Modelling & Software, vol. 15 issue 2, pub. Mar. 8, 2000).*
(Continued)

*Primary Examiner* — Gims Philippe
*Assistant Examiner* — Benjamin Pezzner
(74) *Attorney, Agent, or Firm* — Bacon & Thomas, PLLC

(57) ABSTRACT

A video encoding apparatus includes a frequency transform unit for executing an orthogonal transform on a prediction difference or an original image; a quantizing unit for quantizing transform coefficients outputted by the frequency transform unit; a variable-length coder for executing variable-length encoding on a bit string generated from the quantized transform coefficients; a rate controller for performing a rate control to control a code bit stream outputted by the variable-length coder to be maintained at a bit rate; and a code amount estimating unit for estimating a code amount to be generated by the variable-length coder based on a length of the bit string and an occurrence frequency of symbol in the bit string. The rate controller executes the rate control based on the estimated code amount.

3 Claims, 25 Drawing Sheets

OVERVIEW OF ESTIMATION OF
CODE AMOUNT TO BE GENERATED

(51) Int. Cl.
*H04N 19/13* (2014.01)
*H04N 19/61* (2014.01)
*H04N 19/124* (2014.01)
*H04N 19/146* (2014.01)
*H04N 19/174* (2014.01)

(56) References Cited

U.S. PATENT DOCUMENTS

2005/0243930 A1    11/2005  Asano et al.
2006/0104527 A1*   5/2006   Koto et al. .................... 382/239
2008/0025396 A1*   1/2008   Tasaka et al. ............ 375/240.12
2010/0238056 A1*   9/2010   Seki et al. .................... 341/107

FOREIGN PATENT DOCUMENTS

JP    2009-38746 A     2/2009
JP    2009-55384 A     3/2009
JP    2010-219842 A    9/2010

OTHER PUBLICATIONS

Japanese Office Action dated Nov. 13, 2014 issued in corresponding Japanese application No. 2011-039699 and English translation thereof.

* cited by examiner

INTRA-PICTURE PREDICTION

FIG. 6
(PRIOR ART)
TARGET PICTURE
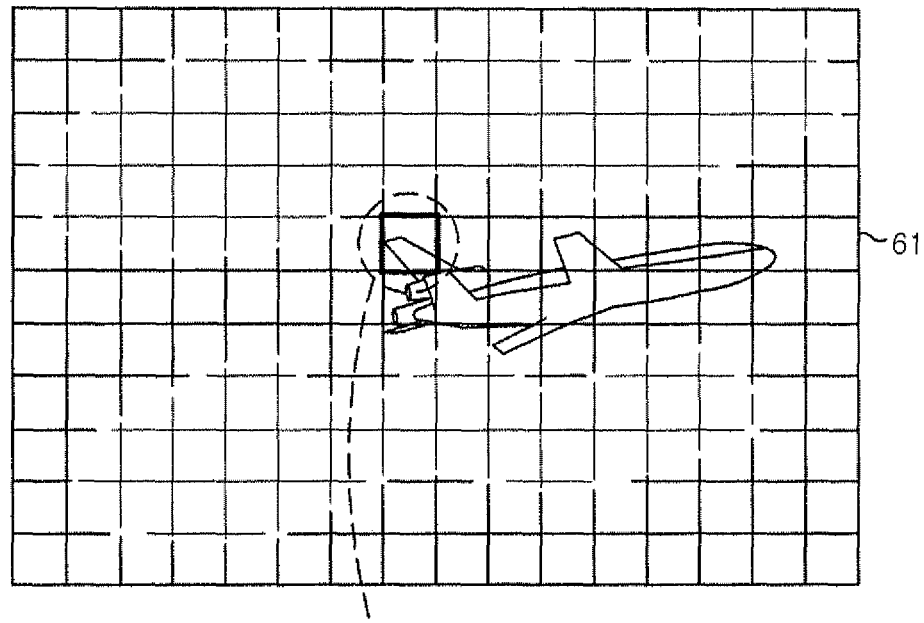
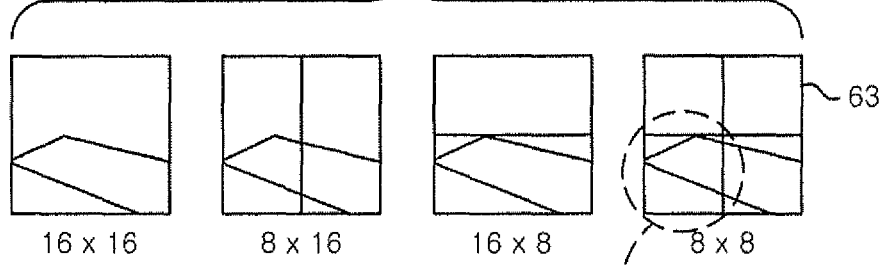
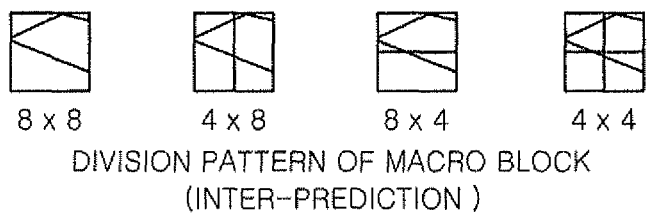
DIVISION PATTERN OF MACRO BLOCK
(INTER-PREDICTION)

FIG. 7
(PRIOR ART)

ENCODING MODE

INTER-PICTURE PREDICTION UNIDIRECTION
- P16 x 16 MODE
- P8 x 16 MODE
- P16 x 8 MODE
- P8 x 8 MODE ──
  - P8 x 8 MODE
  - P8 x 4 MODE ～71
  - P4 x 8 MODE
  - P4 x 4 MODE

INTRA-PICTURE PREDICTION
- I16 x 16 MODE
- I8 x 8 MODE  ～72
- I4 x 4 MODE

OVERVIEW OF CABAC

OVERVIEW OF RATE CONTROL

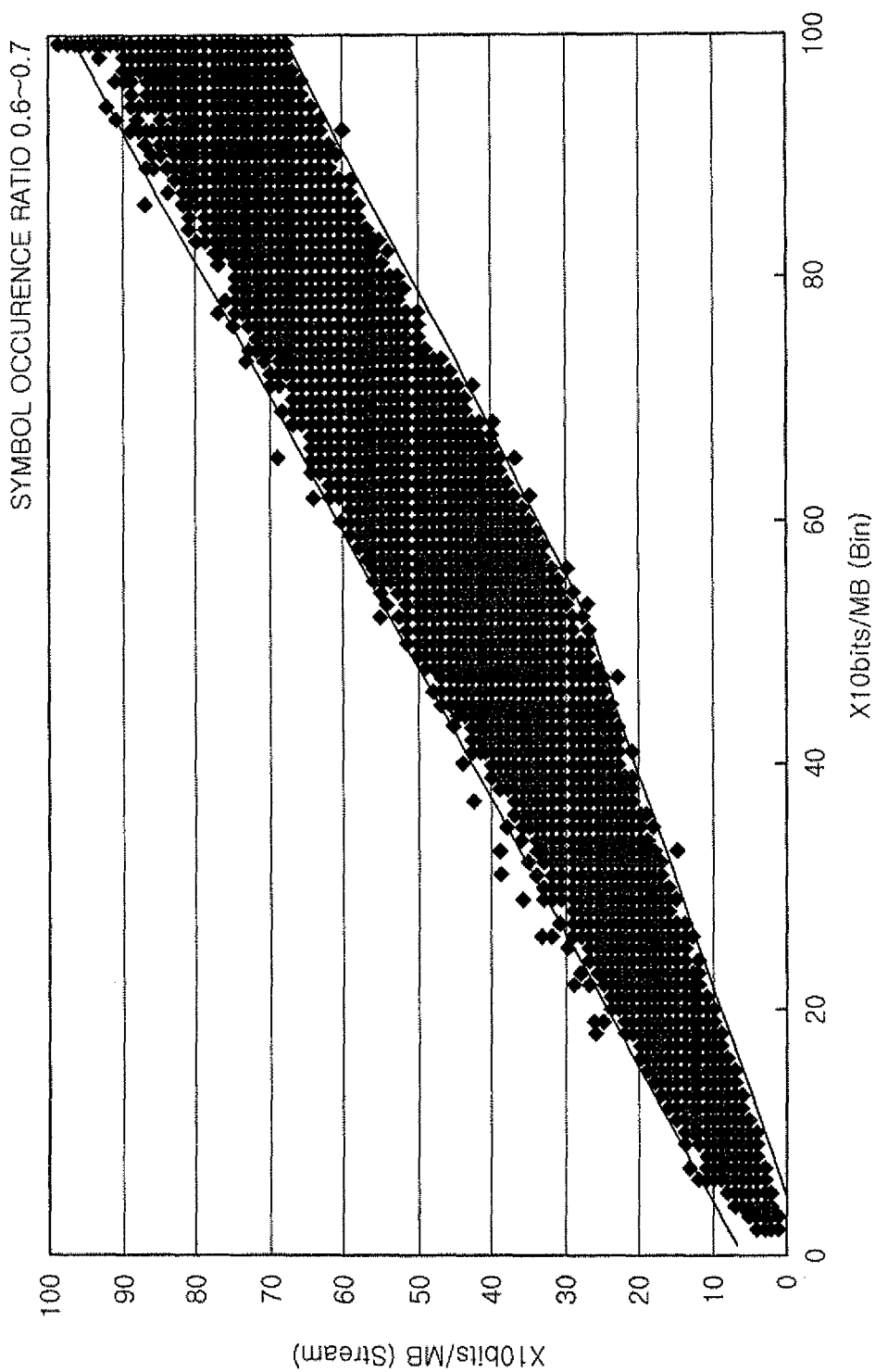

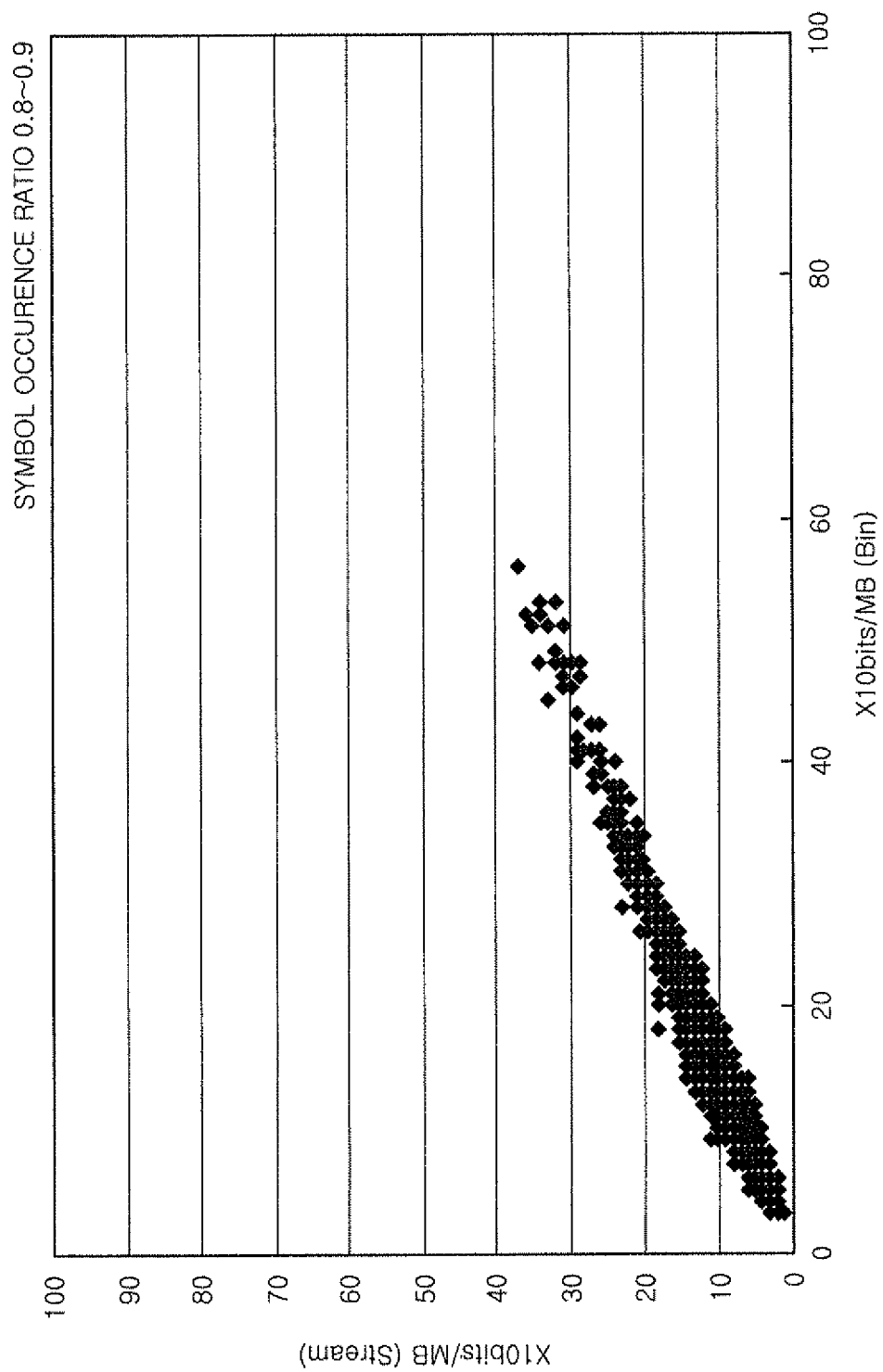

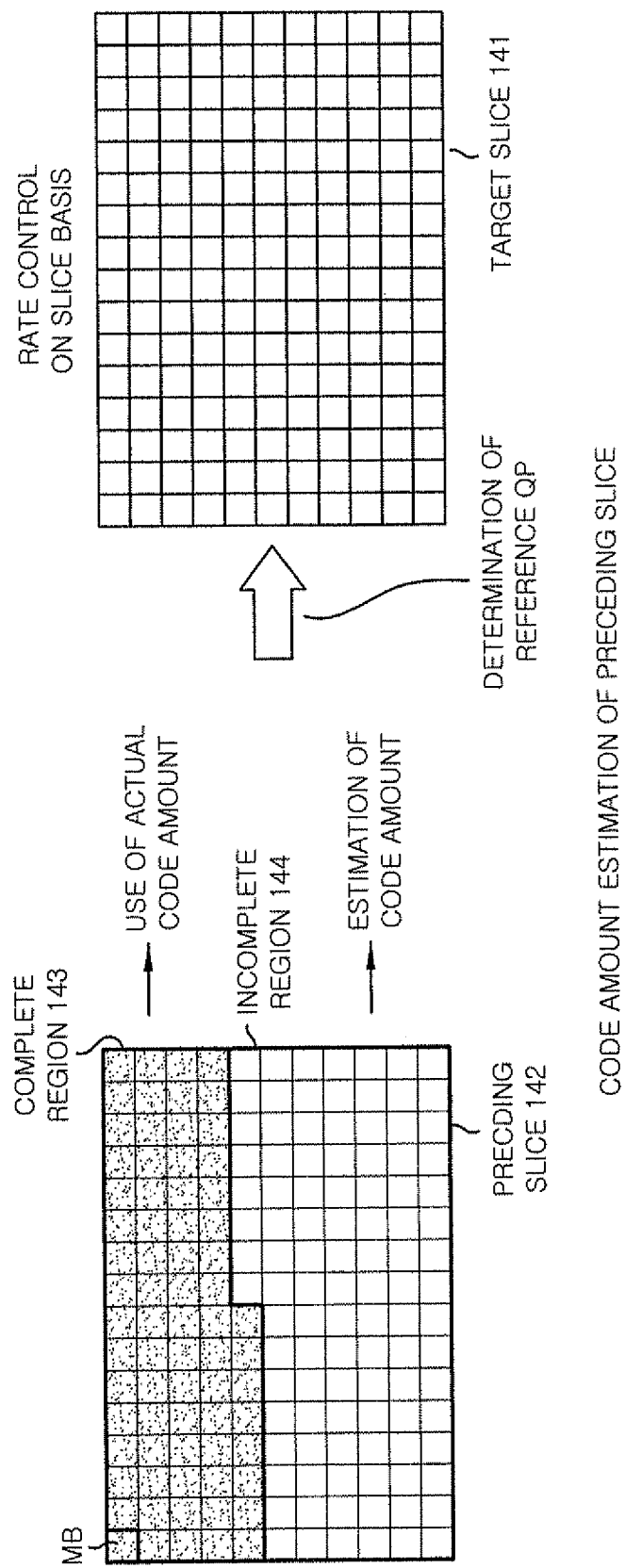

VIDEO ENCODING METHOD AND APPARATUS FOR ESTIMATING A CODE AMOUNT BASED ON BIT STRING LENGTH AND SYMBOL OCCURRENCE FREQUENCY

FIELD OF THE INVENTION

The present invention relates to a video encoding apparatus; and, more particularly, to a video encoding apparatus, capable of executing a rate control by estimating the amount of code bits to be generated.

BACKGROUND OF THE INVENTION

As a technique for recording and transmitting a large volume of video information in the form of digital data, a moving picture experts group (MPEG) encoding method or the like has been adopted and established as an international standard encoding method, e.g., MPEG-1 standard, MPEG-2 standard, MPEG-4 standard, H.264/advanced video coding (AVC) standard.

With these standards, a target image to be encoded is predicted on a block basis by using a reconstructed encoded image (decoded image), and a difference (prediction difference) between the predicted image and the target image is encoded to exclude redundancy in the video signal and reduce an amount of code bits (referred to as code amount hereinafter). Specifically, a DCT (discrete cosine transform) or the like as a type of frequency transform method is executed on the prediction difference, and the generated DCT coefficients are quantized. In general, there is a trade-off between the image quality and the code amount, but the trade-off can be adjusted by controlling a value of parameter employed in quantization (referred to as quantization parameter hereinafter). Hence, when it is necessary to restrict a code amount at a desired bit rate due to limitation in the capacity of a transmission path, an input/output buffer or the like, a coding rate control function needs to be used to adaptively determine the quantization parameter value based on the relationship between a required bit rate and a generated code amount.

Meanwhile, the H.264/AVC standard has adopted, as a variable-length coding method for each syntax element after quantization, a context-based adaptive binary arithmetic coding (CABAC) using an arithmetic coding with high computational burden, in addition to a context-based adaptive variable length coding (CAVLC) enabling high-speed processing based on a look-up table. The use of the CABAC allows the code amount to be reduced by about 10~20% as compared with the use of the CAVLC, but drastically increases computational burden. Accordingly, to realize a real-time processing, there is a need to design an arithmetic coding processing with high computational burden to be performed independently in a separate process. (see, e.g., Japanese Patent Applications Publication Nos. 2010-219842, 2009-021775 and 2008-011204)

However, when the arithmetic coding processing is performed independently, it is difficult to obtain results of the arithmetic coding process on a macroblock basis sequentially to calculate a generated code amount. Consequently, there is a problem of improper execution of a rate control determining a value of a quantization parameter based on the relationship between a required bit rate and a generated code amount.

SUMMARY OF THE INVENTION

In view of the above, the present invention provides a video encoding apparatus which is capable of executing a proper rate control even when results of arithmetic coding processing can not be used in determining a quantization parameter.

The video encoding apparatus in accordance with an embodiment of the present invention estimates a code amount to be generated after the arithmetic encoding and executes a rate control based on a relationship between a required bit rate and, an estimated code amount. Especially, the estimation of the code amount to be generated is executed, prior to the arithmetic encoding, based on a bit string length and a symbol occurrence ratio in the bit string, by using an approximation function designed based on statistical data, for example.

Specifically, the video encoding apparatus includes a frequency transform unit for executing an orthogonal transform on a prediction difference or an original image; a quantizing unit for quantizing transform coefficients outputted by the frequency transform unit; a variable-length coder for executing variable-length encoding on a bit string generated from the quantized transform coefficients; a rate controller for performing a rate control to control a code bit stream outputted by the variable-length coder to be maintained at a bit rate; and a code amount estimating unit for estimating a code amount to be generated by the variable-length coder based on a length of the bit string and an occurrence frequency of symbol in the bit string. The rate control unit executes the rate control based on the estimated code amount.

In the video encoding apparatus, a unit of the symbol may be one bit, and the occurrence frequency of symbol may be obtained by counting the number of 0 or 1 included in the bit string. The rate controller may execute the rate control in unit of picture, slice or block, and the variable-length coder may execute an arithmetic coding on the rate-controlled unit of picture, slice or block. A code amount of the rate-controlled unit may be calculated by using an actual code amount generated from a variable-length coding completed region in the rate-controlled unit and said estimated code amount obtained from a variable-length coding non-completed region of the rate-controlled unit.

In accordance with the embodiment of the present invention, it is possible to execute a proper rate control and effectively encode a video at a desired bit rate even when results of arithmetic coding processing cannot be used in determining a quantization parameter.

BRIEF DESCRIPTION OF THE DRAWINGS

The objects and features of the present invention will become apparent from the following description of embodiments, given in conjunction with the accompanying drawings, in which:

FIG. 6 is a conceptual explanatory diagram of a block size decision upon prediction;

FIG. 7 is a conceptual explanatory diagram of an encoding mode;

FIGS. 13A to 13D are simulation results showing a relationship between a bin string length and a generated code amount (symbol occurrence ratio: 0.6 to 1);

FIG. 14 is a conceptual explanatory diagram of a method for estimating a generated code amount of a preceding slice;

DETAILED DESCRIPTION OF THE EMBODIMENTS

Hereinafter, a video encoding apparatus in accordance with an embodiment of the present invention will be described with reference to the accompanying drawings, which form a part hereof. The video encoding apparatus of the present embodiment executes encoding based on, e.g., H.264/AVC. First, H.264/AVC encoding will be briefly described.

Figure 3:
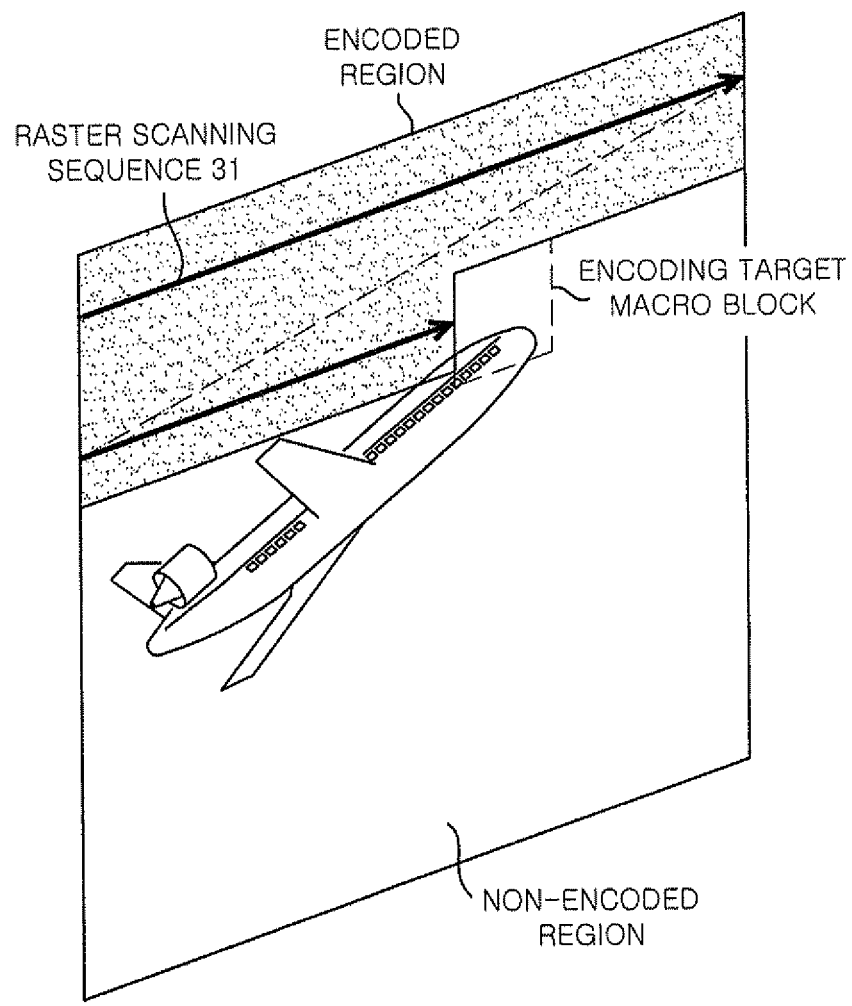
FIG. 3 is a schematic view illustrating an encoding processing carried out on a macroblock basis.

FIG. 3 is a schematic view illustrating an encoding processing carried out on a macroblock basis. H.264/AVC predicts an encoding target image by using information on an image, which has been encoding and reconstructed by decoding, and encodes the prediction difference between the predicted image and the original target image. Here, the DCT is executed on the prediction difference on a DCT block—by DCT block basis which are obtained by finely dividing an image, and thus-obtained DCT coefficients are quantized and then variable-length coded. Each DCT block is obtained by dividing a macroblock of a fixed size (16×16 pixels).

As shown in FIG. 3, the encoding is executed on the target image on, e.g., the macroblock basis in accordance with a raster scanning sequence indicated by an arrow 31.

Figure 4:
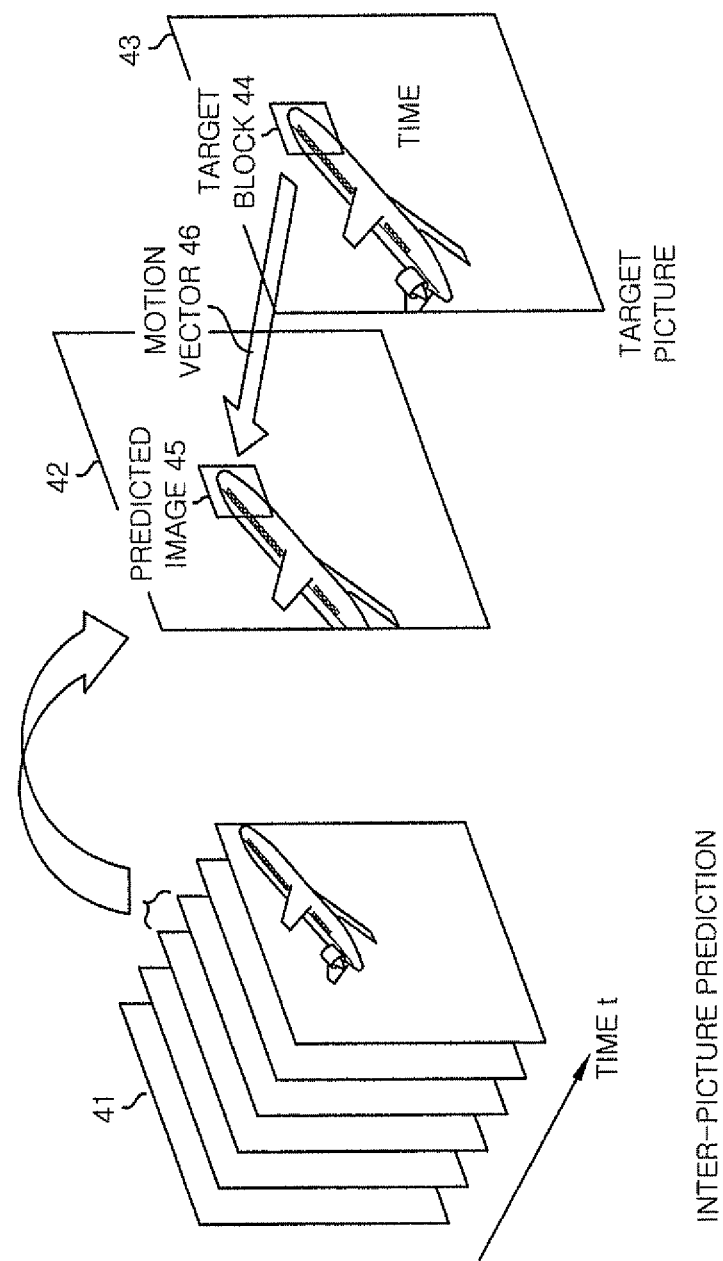
FIG. 4 is a conceptual explanatory diagram of an inter-picture prediction processing.

FIG. 4 is a conceptual explanatory diagram of an operation of an inter-picture prediction by H.264/AVC. Reference numeral 41 denotes a video (groups of sequential pictures) inputted to the video encoding apparatus, and each of a reference picture 42 and an encoding target picture 43 is, e.g., a frame included in a same group of picture 41.

When executing the inter-picture prediction, a block (predicted image) 45 having high similarity to a target block 44 of the encoding target picture 43 is searched from a reconstructed image of an encoded image of the reference picture 42.

Here, in addition to a prediction difference calculated as a difference between the blocks 44 and 45, a motion vector 46 representing the difference between coordinates of the blocks 44 and 45 is encoded as header information required for the reconstruction of the target block 44. Meanwhile, decoding may preferably be executed in the reverse sequence of the aforementioned order, and a decoded prediction difference is added to the block 45 of the reconstructed image of the reference picture 42, thereby obtaining a decoded image.

Figure 5:
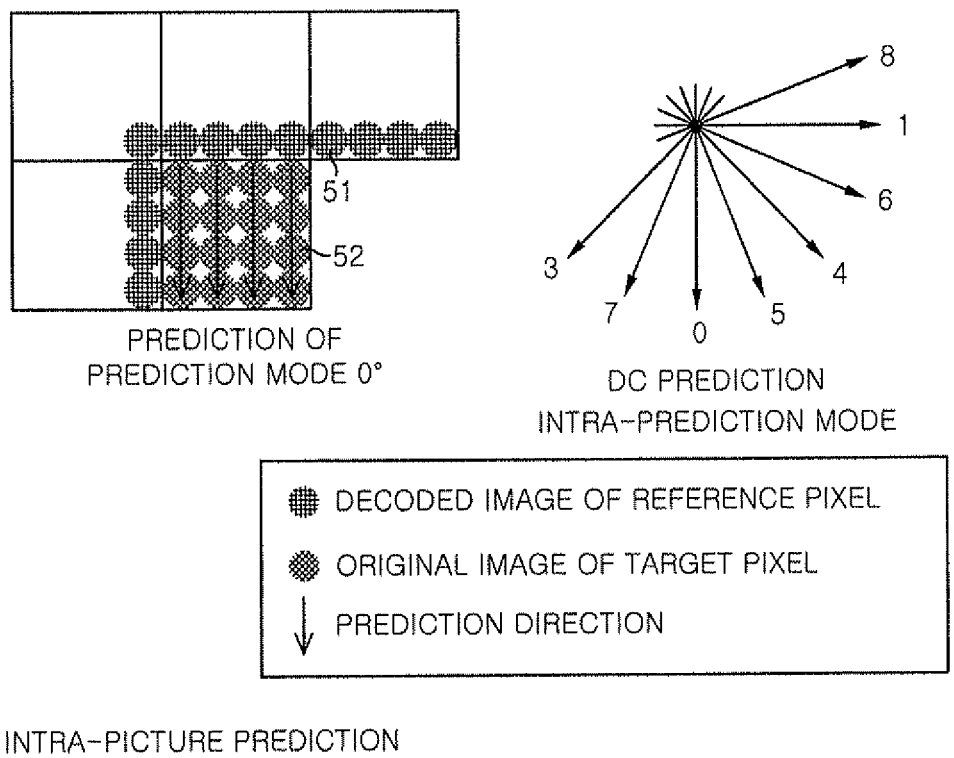
FIG. 5 is a conceptual explanatory diagram of an intra-screen prediction processing.

FIG. 5 is a conceptual explanatory diagram of an operation of an intra-picture prediction by H.264/AVC. In the intra-picture prediction, prediction is executed by using decoded images of encoded blocks, which are adjacent to the left, left/upper, upper, and right/upper sides of an encoding target block. Specifically, the prediction is executed by using, as reference pixels 51, 13 decoded pixels included in the above-described 4 adjacent blocks, and pixels located on the same line having a prediction direction vector 52 are all predicted from a same reference pixel.

As the prediction direction vector 52, an appropriate one may be selected on a block basis from 8 prediction directions, such as a vertical direction, a horizontal direction, a diagonal direction, and the like. Further, in addition to the 8 prediction modes based on such directionality, DC prediction predicting all pixels included in an encoding target block based on the average value of reference pixels is prepared, and information indicating which one is selected from these 9 prediction modes is encoded as header information together with the prediction difference.

FIG. 6 is a conceptual explanatory diagram of a block size decision upon prediction. In H.264/AVC, a macroblock is hierarchically divided into smaller blocks to execute prediction. FIG. 6 shows division patterns of a macroblock that are allowable for execution of the inter-picture prediction. That is, all the macroblocks (which include a macroblock 62) of a target picture 61 may be predicted by selecting an appropriate one of 4 types of predefined division patterns in the range from 16×16 pixel size to 8×8 pixel size. When a division pattern 63 with 8×8 pixel size has been selected, it may be divided further into smaller sub-blocks. Accordingly, it is possible to select one appropriate pattern selected from 8×8 pixel size to 4×4 pixel size for each block. The selected division pattern of the macroblock and an identifier of a prediction method are combined as an encoding mode, which is then encoded as header information.

FIG. 7 is a conceptual explanatory diagram of the encoding mode. The encoding mode may be classified at least into the unidirectional inter-picture prediction 71 and the intra-picture prediction 72. An identifier of the unidirectional inter-picture prediction 71 is "P" (predictive), and an identifier of the intra-picture prediction 72 is "I" (intra).

Figure 8:
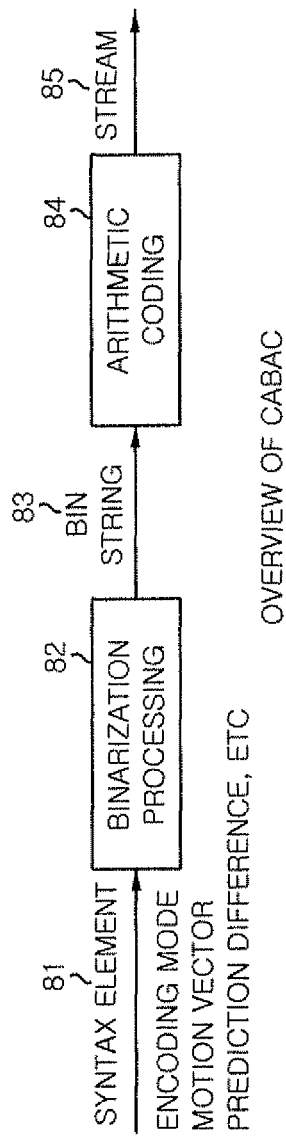
FIG. 8 is a conceptual explanatory diagram of CABAC.

FIG. 8 is a conceptual explanatory diagram of CABAC, which shows a sequence of performing the variable-length encoding on the foregoing header information, prediction difference and the like. H.264/AVC defines two types of variable-length coding schemes, i.e., a content-based adaptive variable length coding (CAVLC) with low computational burden, and a context-based adaptive binary arithmetic coding (CABAC), which exhibits a high computational burden but is able to achieve a high encoding efficiency. The CABAC executes a binarization processing 82 on syntax elements 81 such as header information, prediction difference and the like to transform same into a bit stream (bin string) 83 composed of a binary value of 0 and 1. Thereafter, an arithmetic coding 84 is executed for the bin string 83 to achieve compression, thus generating a code bit stream 85.

Figure 9:
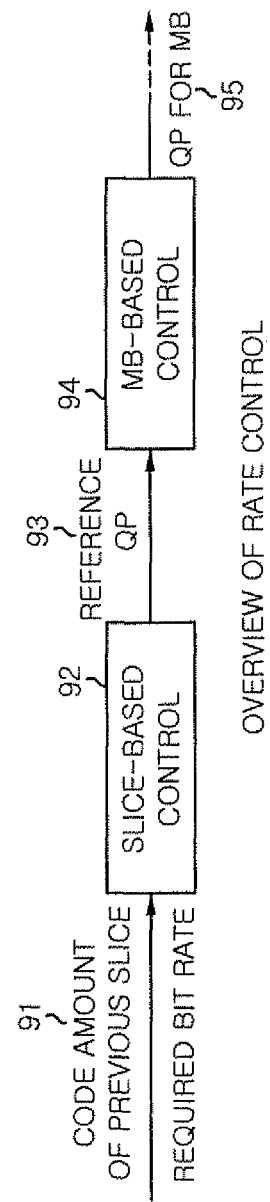
FIG. 9 is a conceptual explanatory diagram of a rate control.

FIG. 9 is a conceptual explanatory diagram of a rate control. In FIG. 9, a rate control 92 is executed first on a slice basis. That is, a quantization parameter (QP) is determined as a reference QP 93 for a target slice. Thereafter, QP 95 for each macroblock (MB) is finally determined based on the reference 93 QP by a rate control 94 on the MB basis within the target slice. Specifically, in the rate control 92 on the slice basis, an allowable code amount (code amount budget) to be generated in the target slice is calculated from a set 91 of a required bit rate and a code amount generated in a preceding slice, and the reference QP 93 is determined based on the calculated code amount budget. Subsequently, the rate control 94 on the MB basis feedbacks a code amount, which has been actually generated in each MB, to detect a change in the code amount, and compensates for the predicted code amount so as to determine the QP for each of the remaining MBs.

However, when the arithmetic encoding is executed separately from other processings as mentioned above, it may be difficult in the rate control carried out on the MB basis to detect the generated code amount of each MB. Also, the preceding slice may have an MB for which the arithmetic encoding has not been completed yet, and the rate control on the slice basis may not be properly performed. Therefore, it is necessary to estimate a code amount for an MB for which the arithmetic encoding has not been completed.

Figure 10:
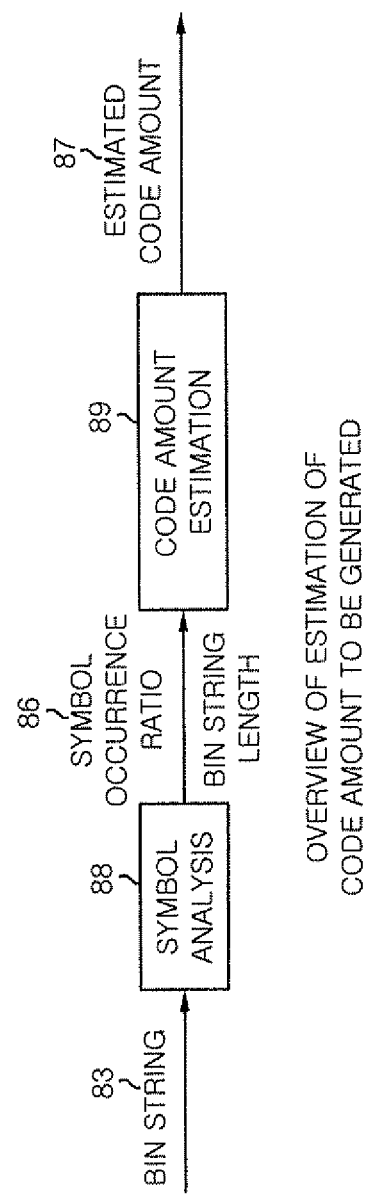
FIG. 10 is a conceptual explanatory diagram of an estimation method for a code amount to be generated.

A feature of an embodiment of the prevent invention will be described in conjunction with FIG. 10, which is a conceptual explanatory diagram of an estimation method for a code amount to be generated. In the estimation method in accordance with the present embodiment, a length of 0/1 symbol (i.e., a length of the bin string 83) and a symbol occurrence probability (or ratio) 86 of, e.g., "0" in the bin string 83 are calculated first by symbol analysis 88. As described above, the bin string 83 is provided by binarization of a syntax element, and an estimated code amount 87 is calculated based on the calculated bin string length and symbol occurrence probability 86 by code amount estimation 89.

Figure 11:
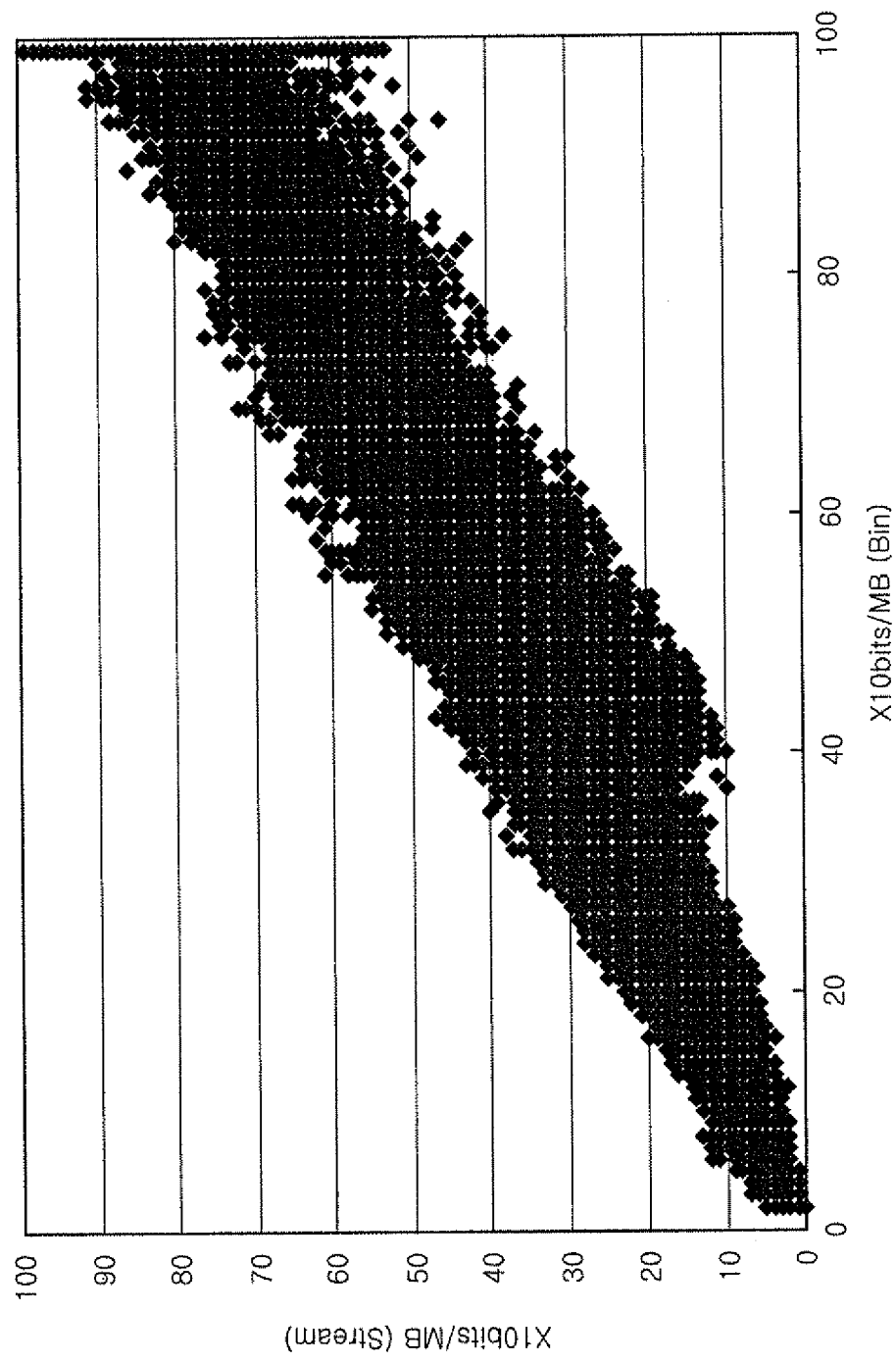
FIG. 11 is a simulation result showing a relationship between a bin string length on macroblock basis and a generated code amount.
Figure 12A:
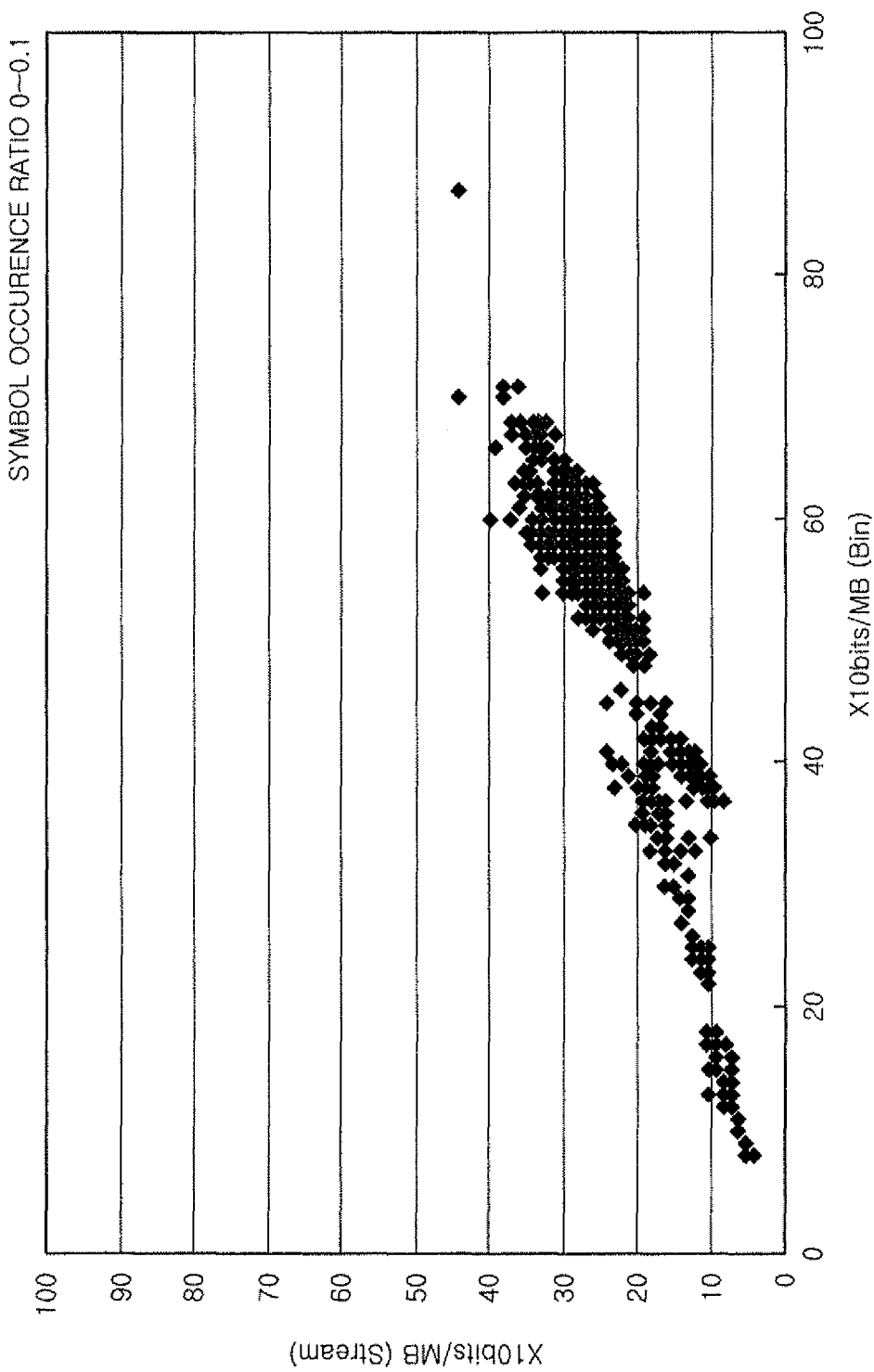
FIGS. 12A to 12F are simulation results showing a relationship between a bin string length and a generated code amount (symbol occurrence ratio: 0 to 0.6)
Figure 12B:
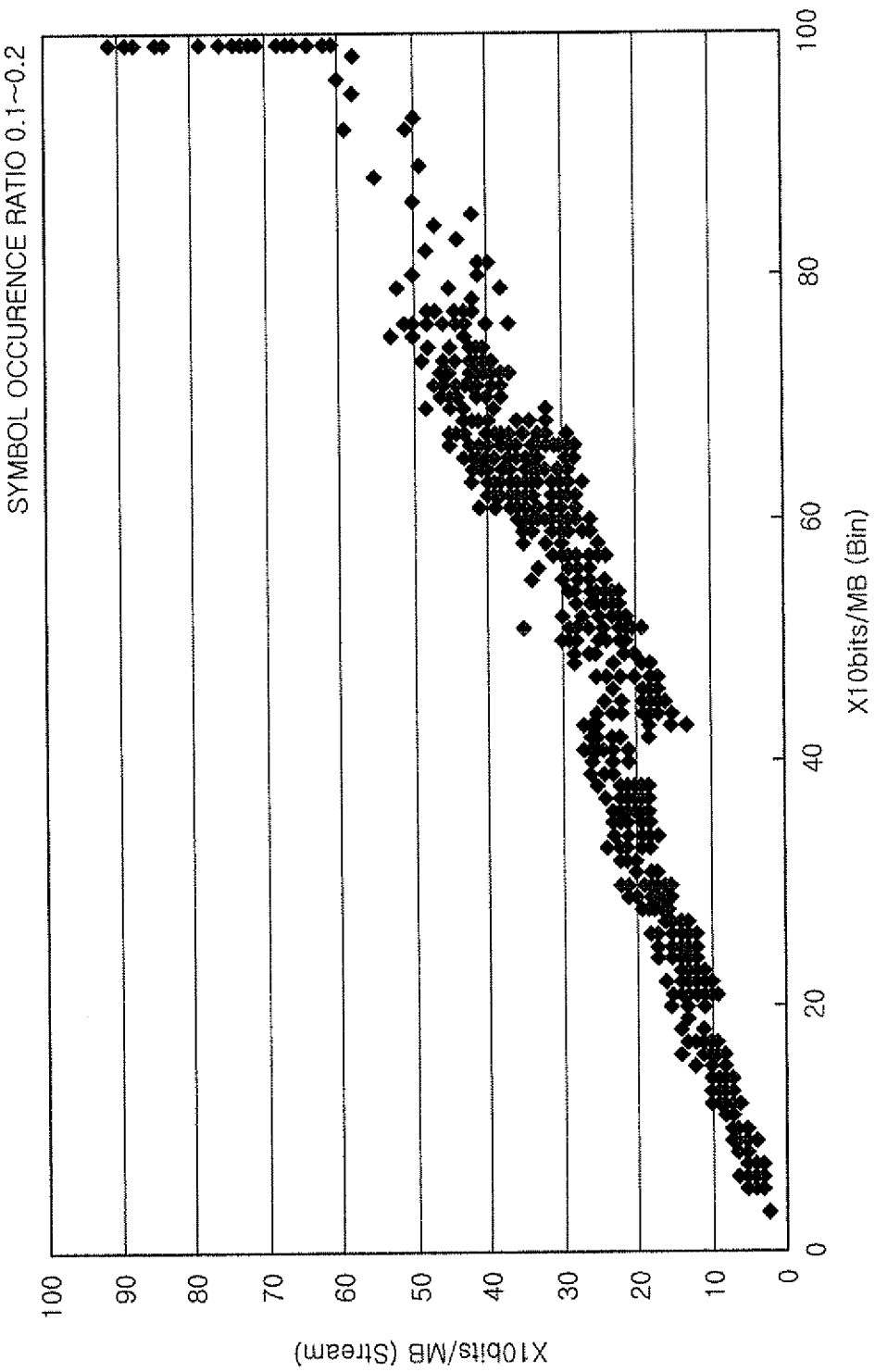
Figure 12C:
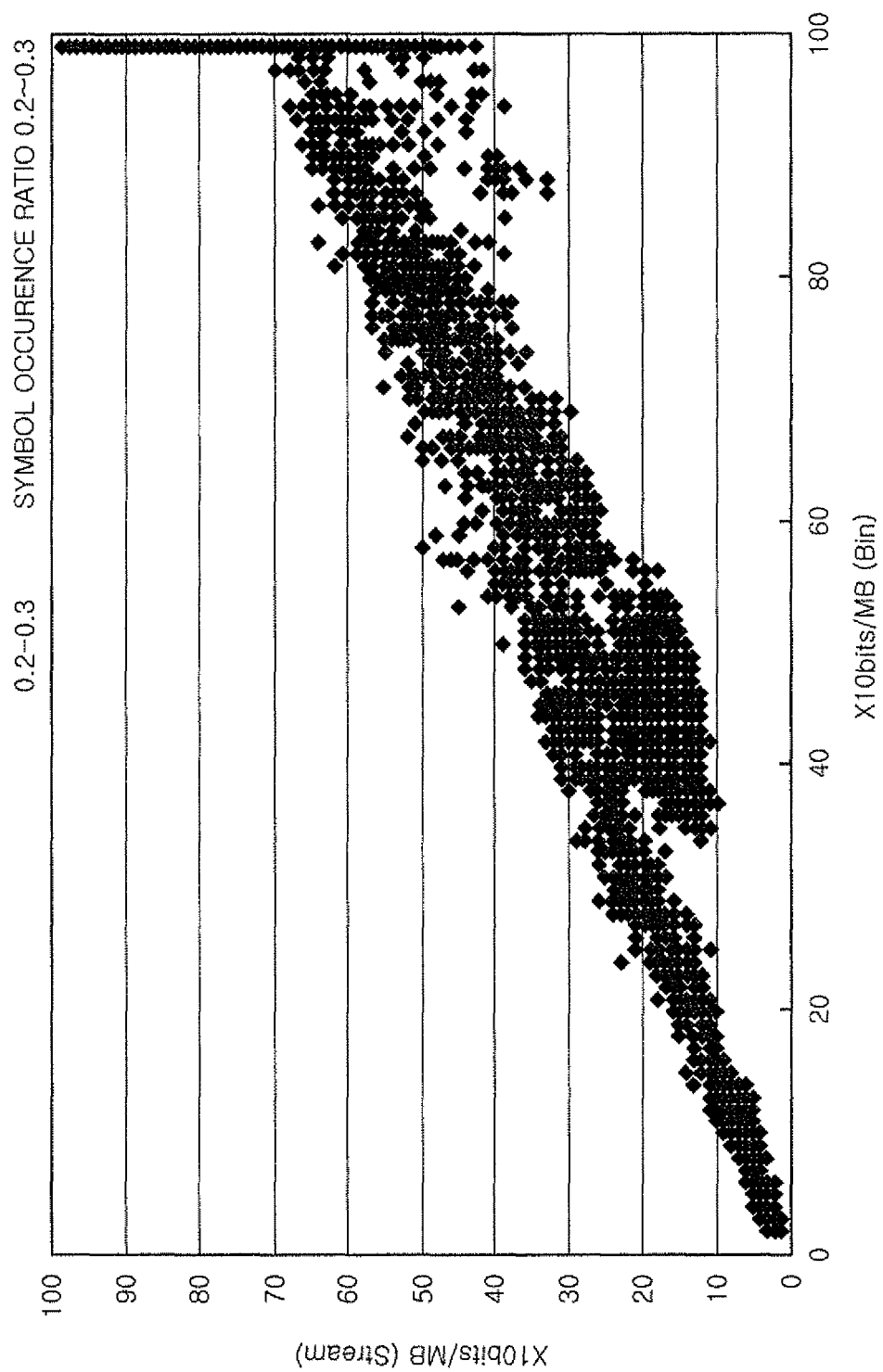
Figure 12D:
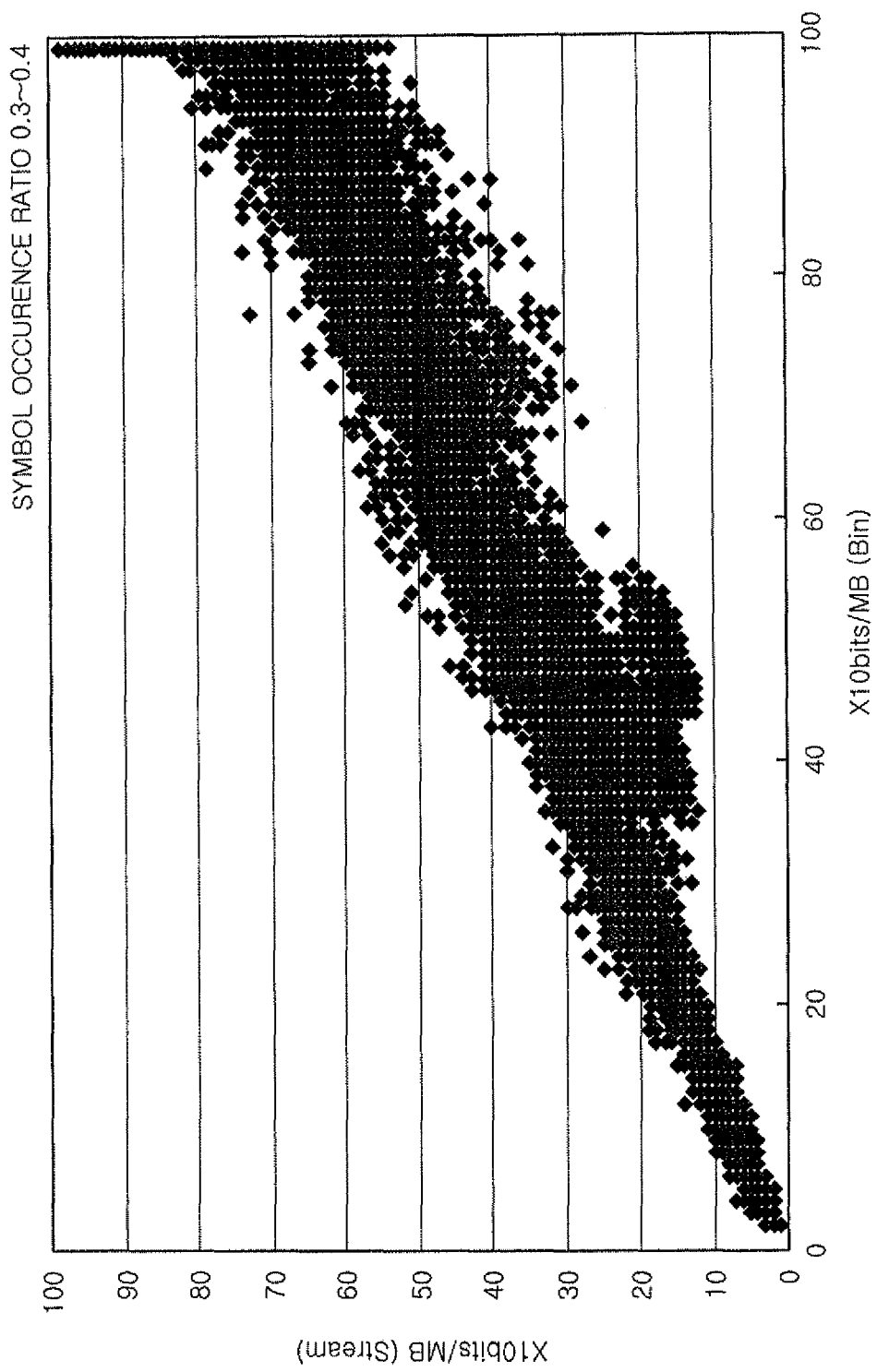
Figure 12E:
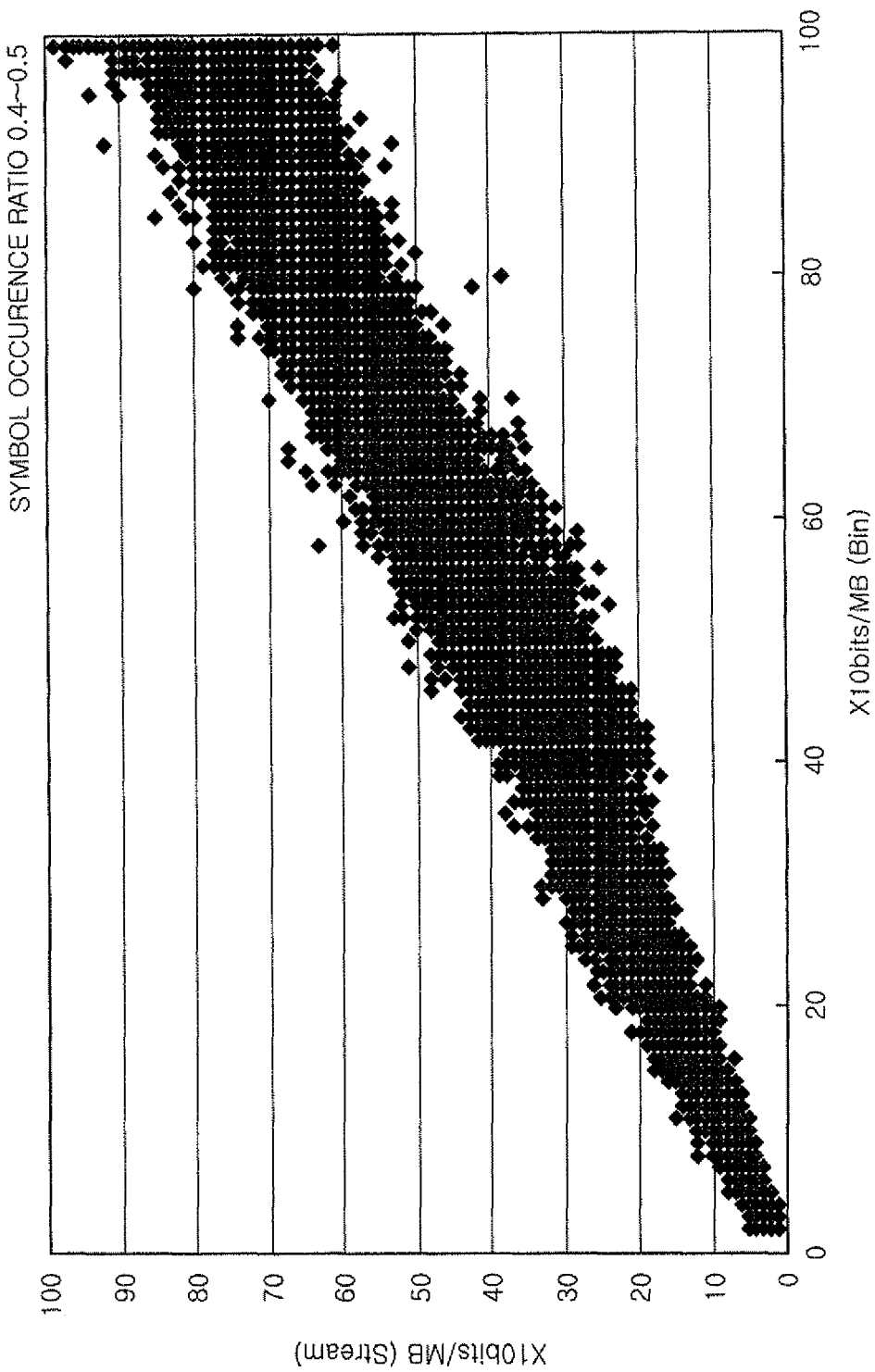
Figure 12F:
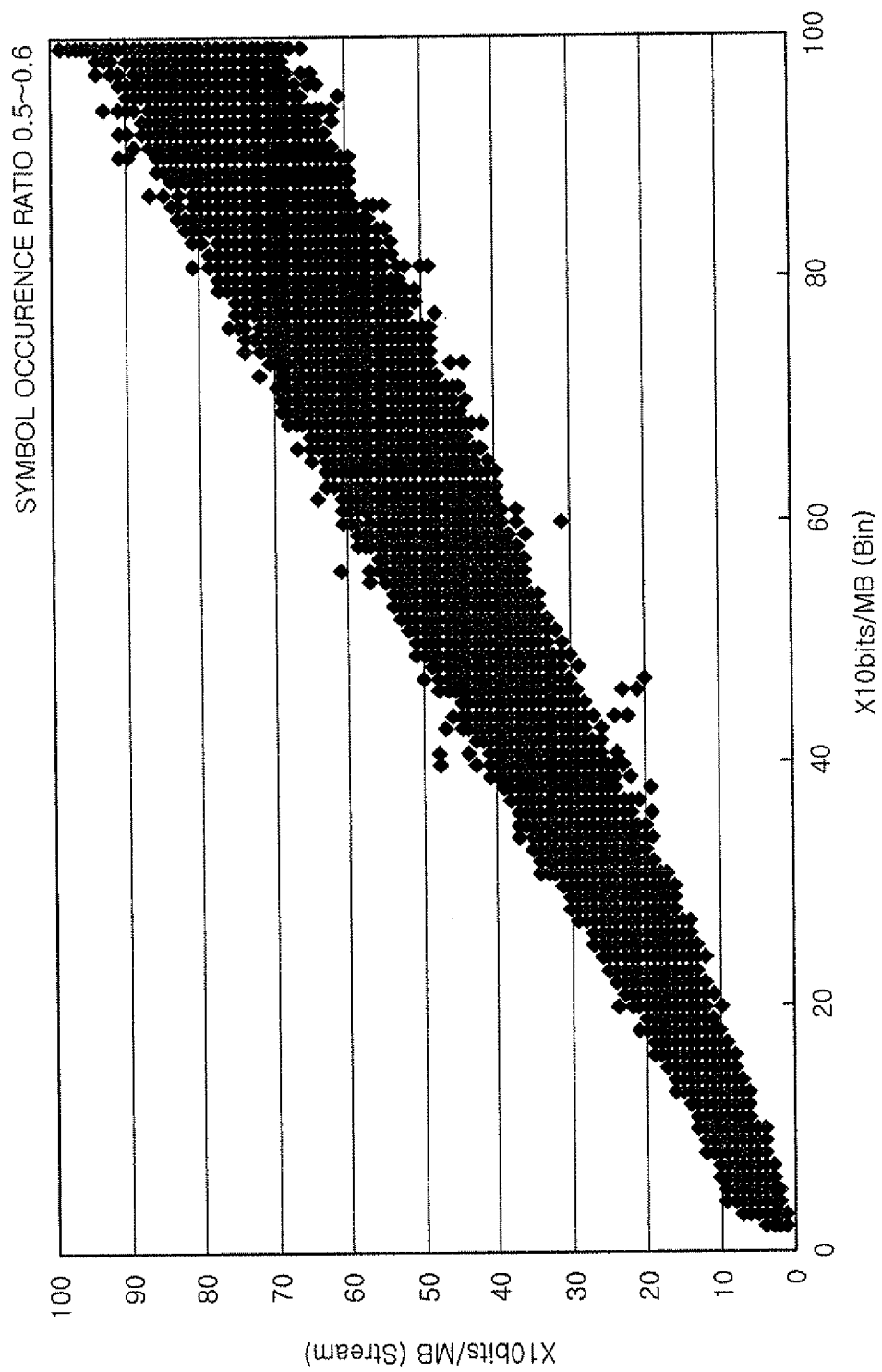
Figure 13B:
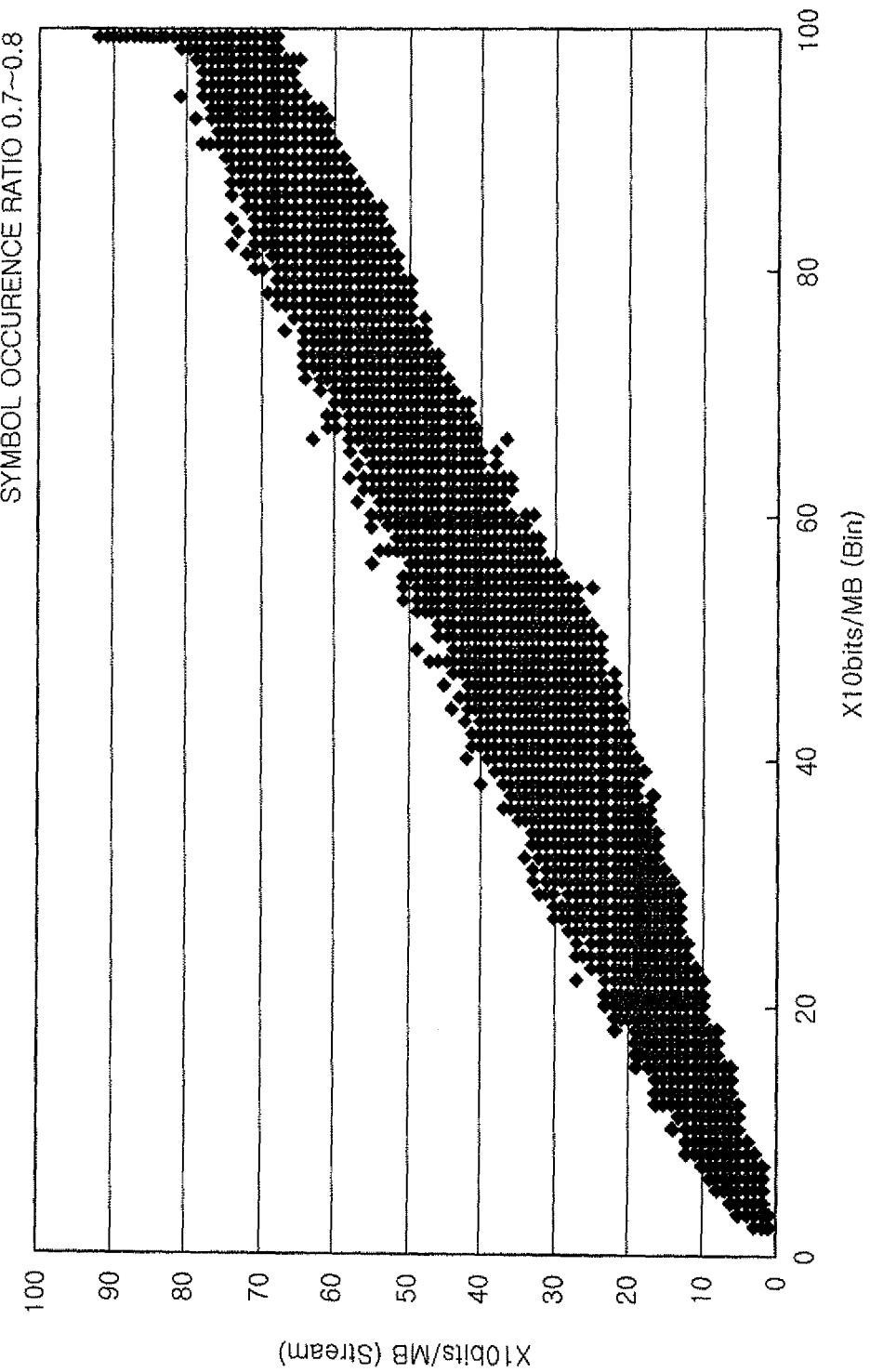
Figure 13D:
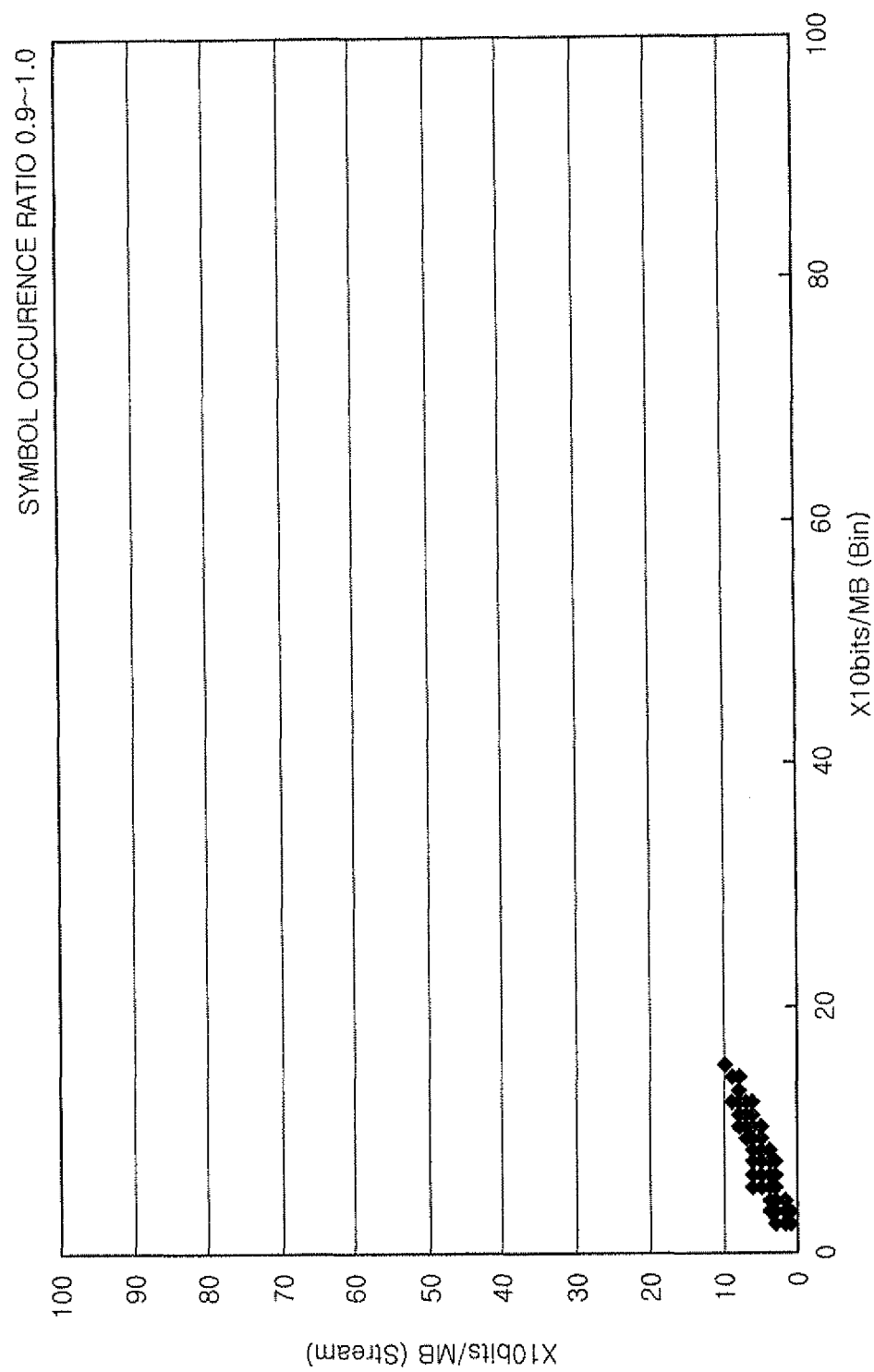

FIG. 11 shows a simulation result of the relationship between a bin string length and a generated code amount on the macroblock basis. In FIG. 11, a horizontal axis is the bin string length and a vertical axis is the generated code amount. These two data exhibit some correlation but with a relatively great variance. Thus, it can be noted that estimation accuracy may not be high when the code amount to be generated on the MB basis is estimated only based on the bin string length.

FIGS. 12A to 13D show simulation results of the relationship between the bin string length and the generated code amount as a function of the symbol occurrence ratio of "0" in the bin string. In the simulation, 26 evaluation videos of "The Institute of Image Information and Television Engineers (ITE)" were employed. Specifically, a video obtained by connecting 30 initial frames of each of the 26 evaluation videos were employed. The relationship between the bin string length and the generated code amount has been categorized by the occurrence ratio (or frequency) of "0" in a bin string of quantized transform coefficients (Coeff) of a target MB into 10 categories with 0.1 pitch of the occurrence ratio. In FIGS. 12A to 13D, a horizontal and a vertical axis are the bin string length and the generated code amount, respectively.

In each MB group (category) having a similar occurrence ratio of the same symbol, data points are relatively locally concentrated and estimation accuracy of a code amount to be generated can be improved. For example, for an MB belonging to a category that an occurrence ratio of the symbol "0" with respect to Coeff is equal to or greater than 0.6 and less than 0.7, the relationship between the bin string length and the generated code amount is concentrated in a region 131. In other categories, it is exhibited that a variance value is dramatically decreased. Modeling of the relationship between the bin string length and the generated code amount for each category makes it possible to estimate the code amount to be generated from the bin string length and the symbol occurrence ratio and to achieve remarkably enhanced estimation accuracy.

The modeling may be realized by any scheme, but an approximation function using, e.g., a least square method or the like may be employed in modeling to effectively remove randomness of the generated code amount.

Figure 18:
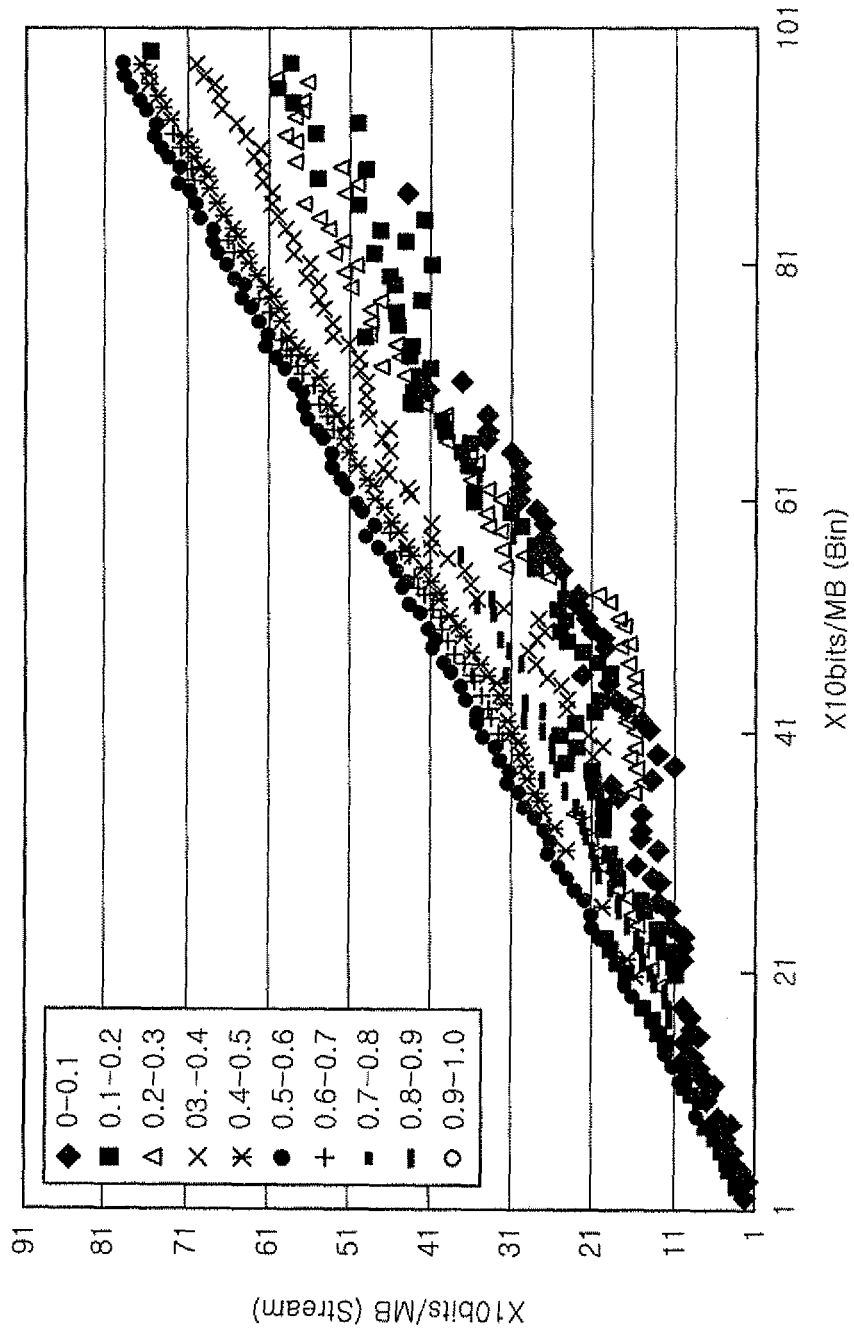
FIG. 18 is a simulation result (average of each symbol occurrence ratio) showing a relationship between a bin string length and a generated code amount.

FIG. 18 is a graph showing an average value of generated code amounts for each bin string length per each category under the same condition as in FIGS. 12A to 13D. Here, for a category where the occurrence ratio of "0" is low, there exist a small number of data samples, and so asperity may be generated in the average code amount. Thus, it may be preferable smoothing the data by using an approximation function. As for the approximation function, a divisional linear approximation (a graph of broken line) may be used. A predetermined approximation function may be used in encoding, or the approximation function may be dynamically updated upon execution of encoding.

Since the degree of the localization of the relationship between the bin string length and the generated code amount may vary depending on the encoding mode (whether it is the intra-picture prediction or the inter-picture prediction, for example), QP or the like, multiple models may be prepared depending on the encoding mode, QP or the like.

Also, various schemes may be employed in calculating a symbol occurrence ratio. The present embodiment executes the calculation of the occurrence ratio only from a prediction difference of a target MB, and it was confirmed that satisfactory accuracy can be obtained thereby. However, the object from which the occurrence ratio is obtained may include other syntax elements such as motion vector, encoding mode or the like. Further, a weighted sum of occurrence ratios for the respective syntax elements may be treated as the occurrence ratio of the MB. Also, in addition to the target MB, symbols of a previously encoded neighboring MB, e.g., MB right before the target MB, may be included in calculating the occurrence ratio of the target MB. In addition, though the present embodiment executes a code amount estimation on the MB basis, it may be possible to execute the code amount estimation on a different processing basis, e.g., picture basis, slice basis, block (other than MB) basis, or the like.

FIG. 14 is a conceptual explanatory diagram of a method of estimating a code amount of the preceding slice. In the rate control on the slice basis, a reference QP of a target slice 141 is determined based on a required bit rate and a code amount of, e.g., the preceding slice 142 preceding in an encoding order. Since, however, a computation amount of the arithmetic coding is extremely high, the arithmetic encoding of the preceding slice 142 is most likely not completed when starting the rate control of the target slice 141. In this case, the preceding slice 142 is divided into a complete region 143, in which the arithmetic encoding is completed, and an incomplete region 144 in which the arithmetic encoding is not completed. Here, the code amount actually generated after the arithmetic encoding is calculated with respect to the region 143 where the arithmetic encoding has been already completed, while the code amount estimation may be executed for the region 144 where the arithmetic encoding has not been completed yet by using the estimated result of a code amount of each MB as mentioned above. The code amount of the preceding slice 142 is estimated by summing the actual code amount of the complete region 143 and the estimated result for the incomplete region 144. The rate control may be executed in unit of a picture or a block other than a slice.

Figure 1:
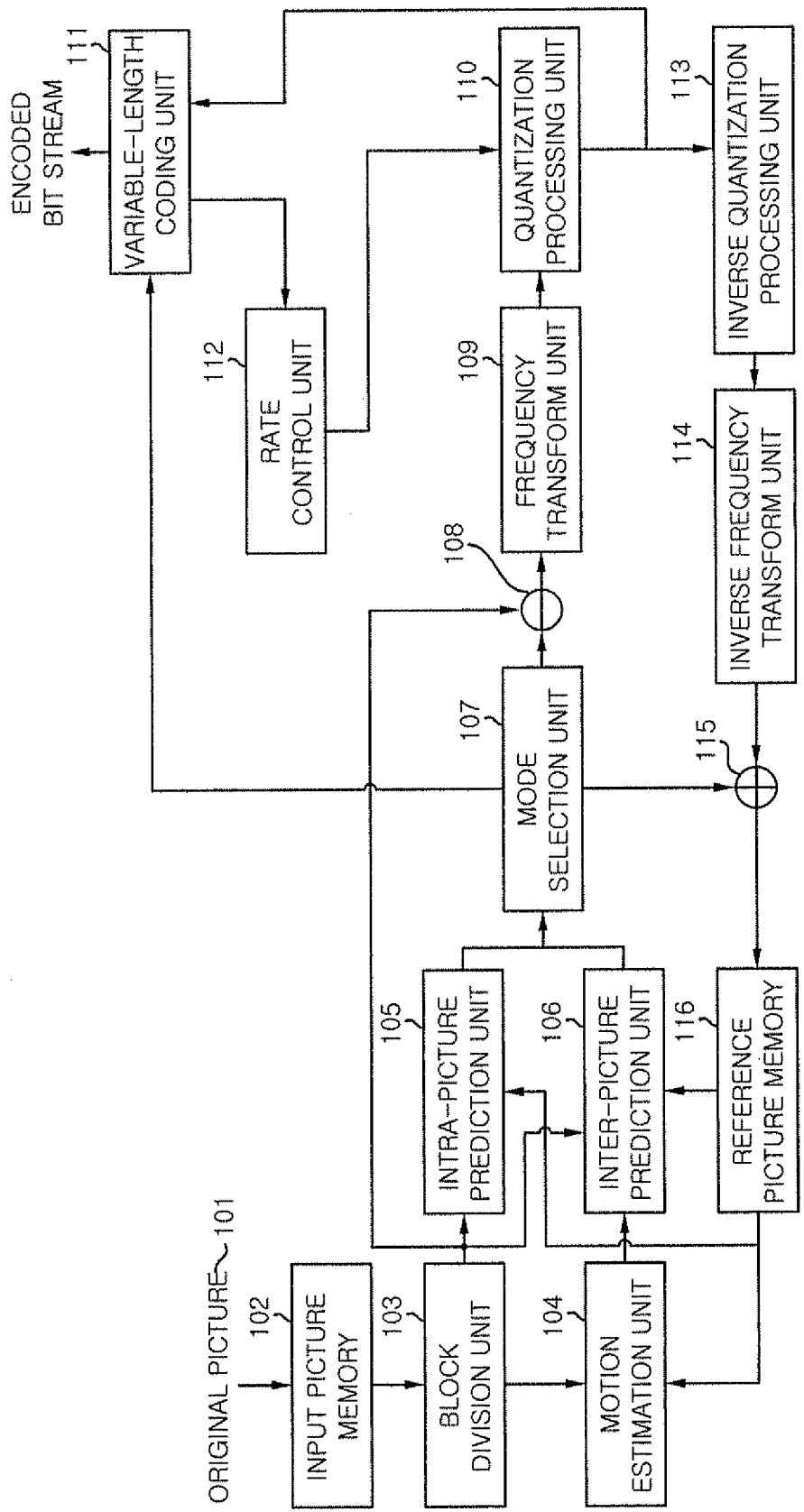
FIG. 1 is a block diagram of a video encoding apparatus in accordance with an embodiment of the present invention.

FIG. 1 is a block diagram of a video encoding apparatus in accordance with the present embodiment. The video encoding apparatus in accordance with the present embodiment includes an input picture memory 102 for storing input original pictures 101, a block division unit 103 for dividing an input picture into small blocks; an intra-picture prediction unit 105 for executing the intra-picture prediction on a block basis; an inter-picture prediction unit 106 for executing the inter-picture prediction on a block basis based on a motion amount detected by a motion estimation unit 104; a mode selection unit 107 for determining a prediction mode (prediction method and block size) suitable for characteristics of a picture; a subtraction unit 108 for generating a prediction difference; and a frequency transform unit 109 and a quantization processing unit 110 for processing the prediction difference into quantized transform coefficients.

The video encoding apparatus further includes a variable-length coding unit 111 for encoding a syntax element such as the quantized transform coefficients or the like; a rate control unit 112 for controlling a quantization parameter such that an encoded bit stream is dealt with at a desired bit rate; an inverse quantization processing unit 113 and an inverse frequency transform unit 114 for reconstructing (decoding) the prediction difference from the quantized transform coefficients; an addition unit 115 for generating a decoded image by using the reconstructed prediction difference; and a reference picture memory 116 for storing the decoded pictures for use in a later prediction. As such, within the range shown in FIG. 1, the configuration of the video encoding apparatus in accordance with the present embodiment is the same as in the related art.

The input picture memory 102 maintains one of the original pictures 101 (having the same meaning as the video 41 described in FIG. 4) as an encoding target picture. The block division unit 103 divides the encoding target picture into small blocks to deliver same to the motion estimation unit 104, the intra-picture prediction unit 105, the inter-picture prediction unit 106, and the subtraction unit 108.

The motion estimation unit 104 calculates a motion amount between a target block and its most similar block by using one or more decoded pictures stored in the reference picture memory 116, and transfers a motion vector to the inter-picture prediction unit 106.

The intra-picture prediction unit 105 and the inter-picture prediction unit 106 respectively execute the intra-picture prediction based on a decoded image of neighboring blocks in the same picture and the inter-picture prediction based on decoded different pictures by using multiple block sizes.

The mode selection unit 107 selects a suitable prediction mode including one of the multiple block sizes processed by both of the prediction units 105 and 106, and provides the predicted image to the subtraction unit 108 and the addition unit 115.

The subtraction unit 108 generates the prediction difference between the original image of the target block and a predicted image selected by the mode selection unit 107, and transfers same to the frequency transform unit 109.

The frequency transform unit 109 executes, e.g., the DCT-based orthogonal transform on the prediction difference on a block basis of a preset size. The quantization processing unit executes the quantization on the transform coefficients by using a quantization matrix and transfers the thus-obtained quantized orthogonal transform coefficients to the variable-length coding unit 111 and the inverse quantizing unit 113.

The variable-length coding unit 111 encodes the quantized orthogonal transform coefficients and the header information based on a symbol occurrence probability to generate an encoded bit stream, and calculates, prior to completing encoding, information (estimated code amount) required for a coding rate control of a target slice to transfer it to the rate control unit 112.

The rate control unit 112 determines an appropriate QP value based on the transferred information from the variable-length coding unit 111 and provides the QP to the quantization processing unit 110. A detailed description thereof will be given later with reference to FIGS. 16 and 17.

The inverse quantization processing unit 113 executes an inverse quantization on the quantized orthogonal transform coefficients and the inverse frequency transform unit 114 executes an inverse orthogonal transform such as inverse DCT on the inverse-quantized transform coefficients to thereby reconstruct the prediction difference and provide same to the addition unit 115. The addition unit 115 then adds the predicted image and the decoded prediction difference so as to generate a decoded image, which is then stored in the reference picture memory 116.

Figure 2:
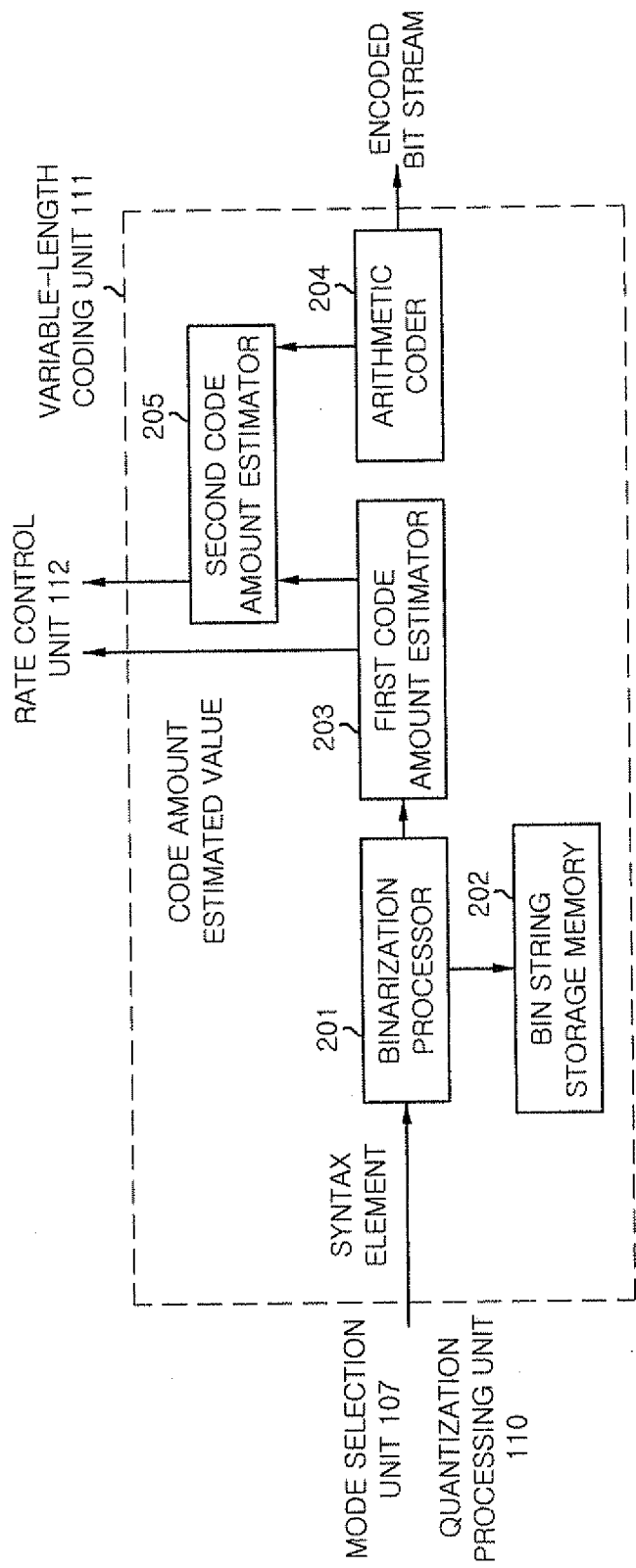
FIG. 2 is another block diagram of the video encoding apparatus.

FIG. 2 shows a detailed example of the variable-length coding unit 111 in accordance with the present embodiment. The variable-length encoding unit 111 includes a binarization processor 201 for executing a binarization processing for each syntax element; a bin string storage memory 202 for storing bin strings obtained through the binarization processing; a first code amount estimator 203 for estimating a code amount to be generated on an MB basis in the foregoing method described in FIGS. 12A to 13D and 18; an arithmetic coder 204 for executing in a separate process an arithmetic coding on binary value information stored in the bin string storage memory 202; and a second code amount estimator 205 for estimating a code amount of a preceding slice in accordance with the method described in FIG. 14.

The estimated code amount of the preceding slice obtained from the second code estimator 205 is provided to the rate control unit 112, which then determinates the reference QP for the target slice. The estimation of the code amount of the preceding slice may be carried out by the rate control unit 112 instead of the second code amount estimator 205. Further, the second code amount estimator 205 may be provided separately from the rate control unit 112 and the variable-length coding unit 111. The first code amount estimator 203 may also be provided in the rate control unit 112 or separately from the rate control unit 112 and the variable-length coding unit 111.

The binarization processor 201 executes a processing corresponding to the binarization processing 82 of the related art described in FIG. 8, and transforms the syntax element, which is inputted by the mode selection unit 107 and the quantization processing unit 110, into a bin string composed of binary values of 0/1 to transfer same to the bin string storage memory 202 and the code amount estimator 203.

The code amount estimator 203 estimates a code amount on the MB basis based on a bin string length and an occurrence ratio of 0/1 symbol. The estimated code amount for the target slice and that for the preceding slice are sent to the rate control unit 112 and the second code amount estimator 205, respectively.

The arithmetic coder 204 executes a processing corresponding to the arithmetic coding 84 of the related art described in FIG. 8, and executes in the separate process the arithmetic coding on the binary value information stored in the bin string storage memory 202.

Figure 15:
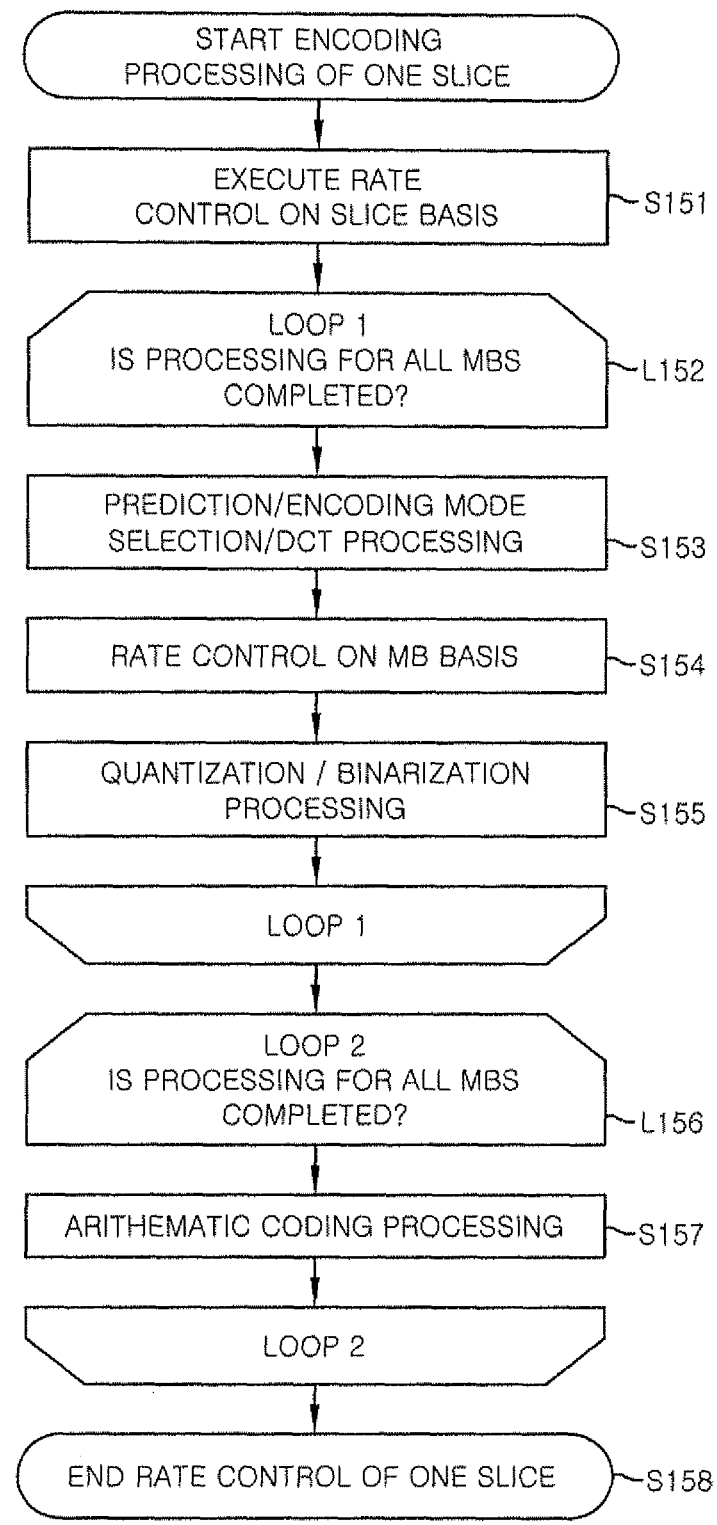
FIG. 15 is a flow chart of an encoding processing by one slice in accordance with the present embodiment.

FIG. 15 is a flow chart showing an encoding processing of one slice in accordance with the present embodiment.

First, in step S151, the rate control unit 112 executes the rate control on the slice basis (as will be described in detail with reference to FIG. 16) to thereby determine a reference QP of the target slice.

Next, in loop L152, until processing of steps S153 to S155 within a first loop is completed for all the MBs within the target slice, the first loop is repeated. Further, step S153 of prediction/encoding mode selection/DCT processing is executed by the motion detection unit 104, the intra-picture prediction unit 105, the inter-picture prediction unit 106, the mode selection unit 107, the subtraction unit 108 and the frequency transform unit 109. Step S154 of rate control on the MB basis (to be explained in detail with reference to FIG. 17) is executed by the rate control unit 112. Step S155 of quantization/binarization processing is executed by the quantization processing unit 110 and the binarization processor 201.

After completion of the first loop, until processing of step S157 within a second loop is completed for all the MBs in the target slice, the second loop is repeated in loop L156. Step S157 is to perform the arithmetic coding on a bin string in a separate process, and is executed by the arithmetic encoder 204.

After completion of the second loop, the rate control of one slice is ended (S158).

Figure 16:
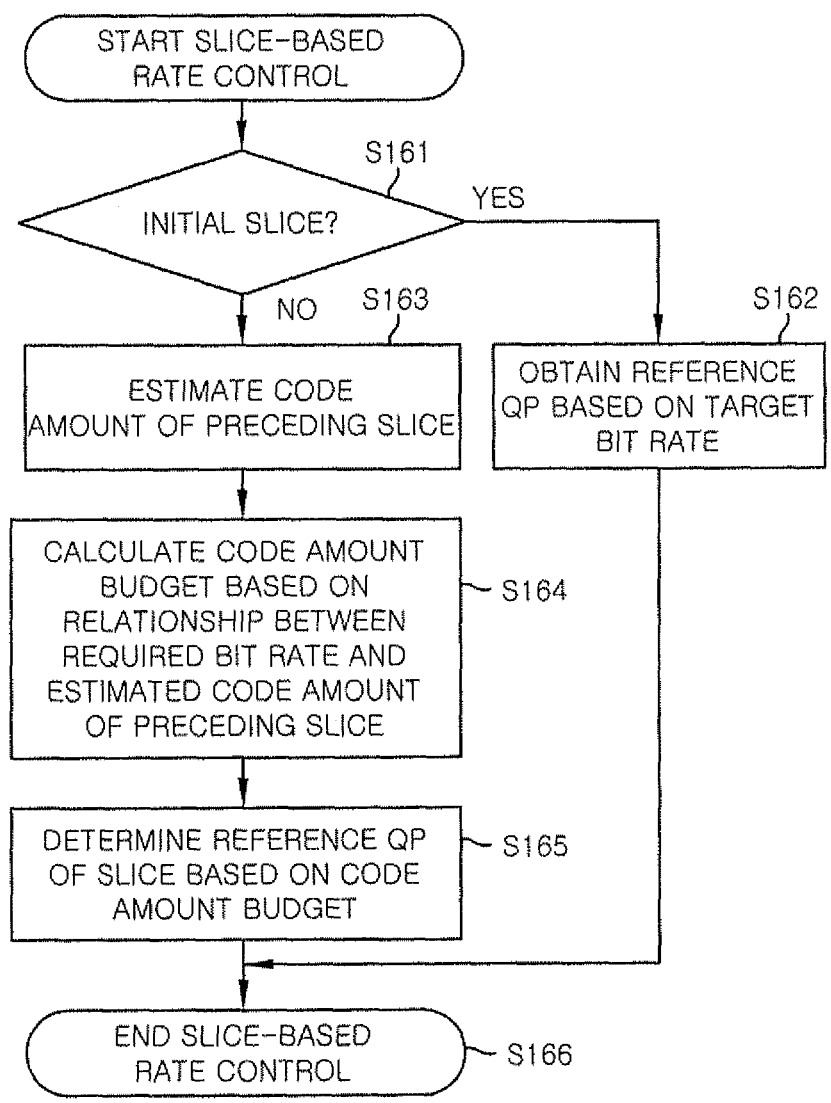
FIG. 16 is a flow chart of a rate control processing carried out on a slice basis in accordance with the present embodiment.

FIG. 16 is a flow chart of the slice-based rate control 151 for one slice carried out by the rate control unit 112 in accordance with the present embodiment.

First, when the target slice is an initial slice ("Yes" in step S161), a reference QP preset based on a target bit rate is obtained (S162).

On the contrary, when the target slice is not the initial slice ("No" in step S161), a code amount of the preceding slice is estimated as illustrated in FIG. 14 in step S163 and an allowable code amount (code amount budget) of the target slice is calculated in step S164 based on the relationship between a required bit rate and the estimated code amount of the preceding slice. The target bit rate is, e.g., a bit rate determined by a code amount assigned to a corresponding picture containing the target slice and the required bit rate is, e.g., a bit rate adjusted from the target bit rate considering actually generated and estimated code amount of preceding slices of the target slice. Also, in step 163, when the arithmetic coding has been completed in every region in the preceding slice, the actually generated code amount is used as the code amount of the preceding slice.

Thereafter, the reference QP of the target slice is determined based on a size of the code amount budget (S165), and then the slice-based rate control for one slice is terminated (S166).

Figure 17:
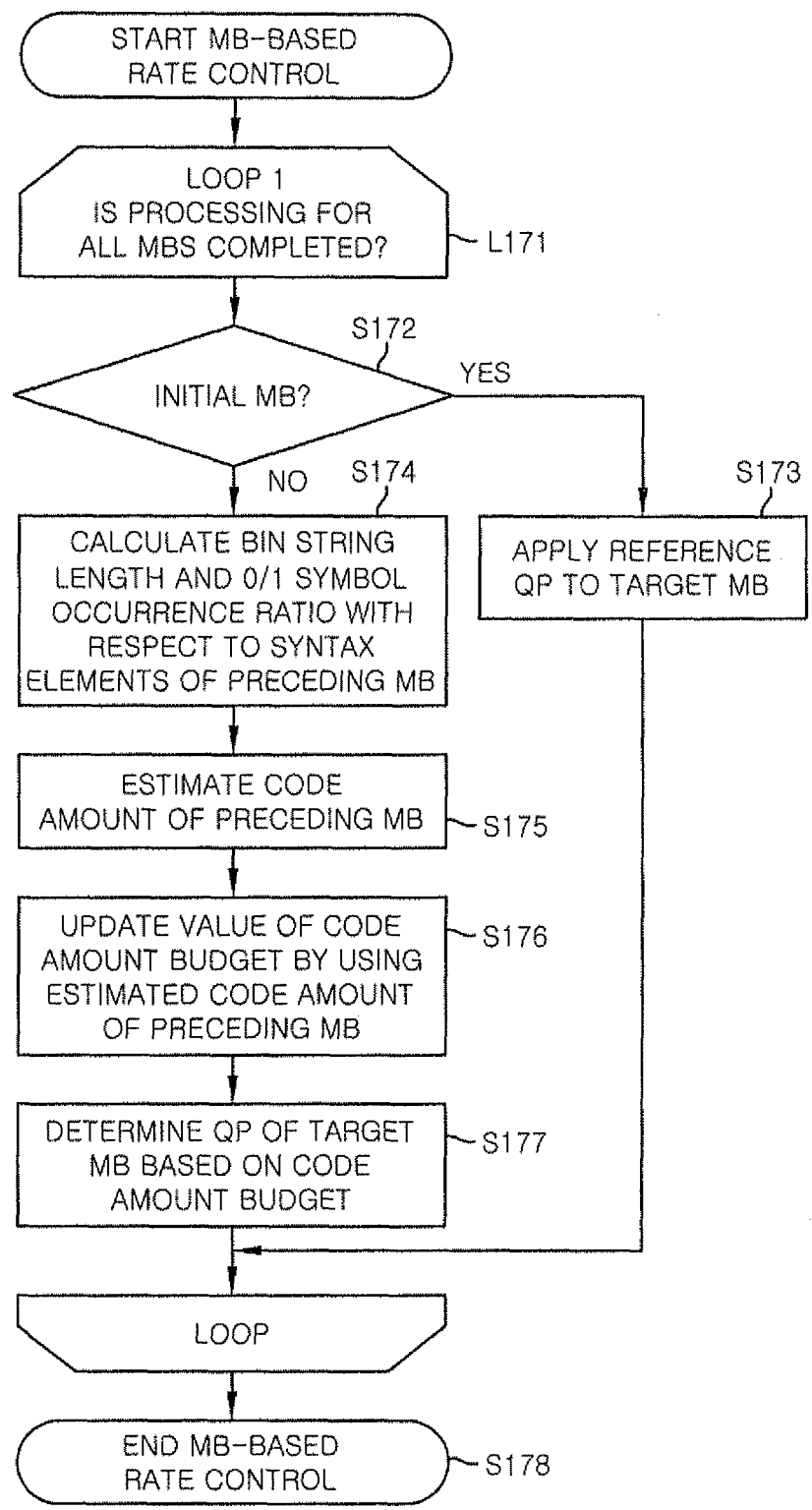
FIG. 17 is a flow chart of a rate control processing carried out on an MB basis in accordance with the present embodiment.

FIG. 17 is a flow chart of the MB-based rate control 154 shown in FIG. 15, in a processing for one slice.

In loop L171, until processing of steps S172 to S177 within the loop is completed with respect to all the MBs within the target slice, the loop is repeated. That is, when the target MB is an initial MB within the target slice ("Yes" in step S172), the reference QP determined by the slice-based rate control is applied to the target MB (S173).

On the contrary, when the target MB is not the initial MB ("No" step in S172), the first code amount estimator 203 calculates a bin string length and a 0/1 symbol occurrence ratio with respect to syntax elements in a preceding MB (S174), thereby estimating a code amount of the preceding MB by the method described with reference to FIGS. 12A to 13D (S175). Subsequently, the rate control unit 112 updates a value of the code amount budget by using the estimated code amount of the preceding MB (176) to thereby determine QP of the target MB based on the code amount budget after the update (S177).

Upon completion of the foregoing process for all the MBs, the MB-based rate control for one slice is terminated (S178).

The first embodiment of the present invention has been described that the prediction and frequency transform are executed on a block basis. However, without limitation thereto, such operations may be executed, for example, in unit of object separated from a background of an image. Further, as one example of the frequency transform, DCT has been described, but the present invention may employ any transform scheme, such as discrete sine transform (DST), discrete wavelet transform (DWT), discrete Fourier transform (DFT), Karhune n-Loeve transform (KLT) or the like, so long as it is an orthogonal transform used for an inter-pixel redundancy removal.

Also, in the intra mode, without executing an intra-picture prediction, a frequency transform may be performed directly on an original image, as done in an intra encoding of MPEG-1 or MPEG-2, or encoding schemes for a still image such as JPEG and JPEG2000.

In addition, the variable-length coding method may not be limited to the CABAL, but other method may be employed so long as it uses the arithmetic coding. Further, instead of the arithmetic encoding, other encoding schemes may be used if they execute compression using a variation of a symbol occurrence frequency.

The present invention may be applicable not only to the video encoding method H.264/AVC but also any image encoding method enabling a rate control (change in a coding rate), such as JPEG2000 as a still image encoding method, a next-generation standard defined from now, and the like.

While the invention has been shown and described with respect to the particular embodiments, it will be understood by those skilled in the art that various changes and modification may be made.

What is claimed is:

1. A video encoding apparatus, comprising:
   a frequency transform unit for executing an orthogonal transform on a prediction difference or an original image;
   a quantizing unit for quantizing transform coefficients outputted by the frequency transform unit;
   a variable-length coder for executing variable-length encoding on the quantized transform coefficients; and
   a rate controller for performing a rate control of an encoded bit stream outputted from the variable-length coder to maintain a desired bit rate for a rate controlled unit, the rate controlled unit being one of a picture, a slice or a block,
   wherein the variable-length coder executes an arithmetic coding on the rate-controlled unit,
   wherein the variable-length coder calculates a code amount of the rate-controlled unit by using an actual code amount generated from a variable-length coding completed region in the rate-controlled unit, and an estimated code amount obtained based on a length of a bit string in a variable-length coding non-completed region in the rate-controlled unit and an occurrence frequency of a one-bit symbol in the bit string, the occurrence frequency of the one-bit symbol being obtained by counting either the number of zeros included in the bit string or the number of ones included in the bit string,
   wherein the estimated code amount is obtained by using a broken line approximation function, which is prepared for each category in accordance with the occurrence frequency and represents a relationship between the length of the bit string and a code amount to be generated, and
   wherein the rate controller executes the rate control based on the calculated code amount.

2. A video encoding method comprising:
- executing an orthogonal transform on a prediction difference or an original image to provide transform coefficients;
- executing quantization on the transform coefficients;
- executing variable-length coding on the quantized transform coefficients;
- executing a rate control of an encoded bit stream to maintain a desired bit rate for a rate controlled unit, the rate controlled unit being one of a picture, a slice or a block; and
- calculating a code amount of the rate-controlled unit by using an actual code amount generated from a variable-length coding completed region in the rate-controlled unit, and an estimated code amount obtained based on a length of a bit string in a variable-length coding non-completed region in the rate-controlled unit and an occurrence frequency of a one-bit symbol in the bit string, the occurrence frequency of the one-bit symbol being obtained by counting either the number of zeroes included in the bit string or the number of ones included in the bit string,
- wherein the estimated code amount is obtained by using a broken line approximation function, which is prepared for each category in accordance with the occurrence frequency and represents a relationship between the length of the bit string and a code amount to be generated,
- wherein the variable-length coding includes an arithmetic coding on the rate-controlled unit, and
- wherein the rate control is executed based on the calculated code amount.

3. A non-transitory computer-readable storage medium for storing a computer program executable on a computer, the computer program controlling a video encoding apparatus to perform a video encoding method, the method comprising:
- executing an orthogonal transform on a prediction difference or an original image to provide transform coefficients;
- executing quantization on the transform coefficients;
- executing variable-length coding on the quantized transform coefficients;
- executing a rate control of a encoded bit stream to maintain at a desired bit rate for a rate controlled unit, the rate controlled unit being one of a picture, a slice or a block; and
- calculating a code amount of the rate-controlled unit by using an actual code amount generated from a variable-length coding completed region in the rate-controlled unit, and an estimated code amount obtained based on a length of a bit string in a variable-length coding non-completed region in the rate-controlled unit and an occurrence frequency of a one-bit symbol in the bit string, the occurrence frequency of the one-bit symbol being obtained by counting either the number of zeroes included in the bit string or the number of ones included in the bit string,
- wherein the estimated code amount is obtained by using a broken line approximation function, which is prepared for each category in accordance with the occurrence frequency and represents a relationship between the length of the bit string and a code amount to be generated, and
- wherein the variable-length coding includes an arithmetic coding on the rate-controlled unit, and
- wherein the rate control is executed based on the calculated code amount.

\* \* \* \* \*